(12) United States Patent
Kim

(10) Patent No.: US 8,033,481 B2
(45) Date of Patent: Oct. 11, 2011

(54) STRUCTURE FOR FIXING REDUCER FOR SPRINKLER IN SIDE WALL

(75) Inventor: Hyung Soo Kim, Jungnang-gu (KR)

(73) Assignees: Yong Won E.N.C. Ltd., Yeongdeungpo-gu (KR); Morti Hirsch, New York, NY (US)

( * ) Notice: Subject to any disclaimer, the term of this patent is extended or adjusted under 35 U.S.C. 154(b) by 114 days.

(21) Appl. No.: 12/460,549

(22) Filed: Jul. 20, 2009

(65) Prior Publication Data
US 2010/0025549 A1    Feb. 4, 2010

Related U.S. Application Data

(62) Division of application No. 11/731,693, filed on Mar. 30, 2007, now Pat. No. 7,665,674.

(51) Int. Cl.
*B05B 15/10* (2006.01)

(52) U.S. Cl. ........................................ 239/208; 239/200

(58) Field of Classification Search .......... 239/200–209, 239/195; 169/5, 16, 17, 54, 64–66; 248/62, 248/65, 317, 342
See application file for complete search history.

(56) References Cited

U.S. PATENT DOCUMENTS

| | | | |
|---|---|---|---|
| 6,260,810 B1 * | 7/2001 | Choi | 248/65 |
| 6,345,800 B1 * | 2/2002 | Herst et al. | 248/342 |
| 6,554,231 B2 * | 4/2003 | Choi | 248/65 |
| 6,811,130 B1 * | 11/2004 | Oh | 248/343 |
| 7,255,315 B2 * | 8/2007 | Oh | 248/342 |
| 7,264,214 B2 * | 9/2007 | Oh | 248/342 |

* cited by examiner

*Primary Examiner* — Davis Hwu
(74) *Attorney, Agent, or Firm* — Day Pitney LLP

(57) ABSTRACT

The present invention relates to a structure for fixing a reducer for a sprinkler in a side wall, and more particularly, to a structure for fixing a reducer for a sprinkler for side wall construction, in which since the reducer can easily adjust a distance from the side wall in the horizontal direction, a connection work between the reducer and the sprinkler head for the side wall construction connected to the reducer can be conveniently performed.

1 Claim, 17 Drawing Sheets

STRUCTURE FOR FIXING REDUCER FOR SPRINKLER IN SIDE WALL

This is a divisional application based on U.S. patent application Ser. No. 11/731,693, filed Mar. 30, 2007 now U.S. Pat. No. 7,665,674.

BACKGROUND OF THE INVENTION

1. Field of the Invention

The present invention relates to a structure for fixing a reducer for a sprinkler in a side wall, and more particularly, to a structure for fixing a reducer for a sprinkler for side wall construction, in which since the reducer can easily adjust a distance from the side wall in the horizontal direction, a connection work between the reducer and the sprinkler head for the side wall construction connected to the reducer can be conveniently performed.

2. Description of the Related Art

As is well known, sprinklers are used as agricultural water spraying machines which sprinkle water over agricultural lands or lawn grounds, etc., in order to grow plants up well. For example, it is difficult to take care of the broad lawn grounds etc., without using facilities of sprinklers. Therefore, sprinklers should be installed from place to place in the broad lawn grounds, etc, by taking the sprinklers into consideration at the step of a planting design. Water transferred from a pressurizing pump is sprayed via a nozzle in a sprinkler in which a special spring is loaded.

According to a sprinkling mode, a sprinkler is classified into a pop-up type, a stationary type, and a rotary type adopting both the pop-up type and the stationary type.

In the case of the pop-up type sprinkler, when the sprinkler is not operated, a sprinkler head is usually buried into the ground as an original position and when the sprinkler is operated, the sprinkler head pops up from the ground and returns to the original position as soon as the operation ends. In the case of the stationary type sprinkler, a sprinkler head is usually protruded from the ground as an original position in which the sprinkler head rotates and sprays when the sprinkler is operated. Thus, the production and installation cost is low but when one mows the lawn, a mower is inconveniently interrupted by the sprinkler head. Since the rotary type sprinkler gradually sprays water while rotating, it is suitable for a wide region.

Generally, a sprinkling amount of a sprinkler is 5-400 l/min, and the sprinkling diameter is 5-60 m, a rotational turnaround time is 30 seconds to 2 minutes. Besides, there are various kinds of sprinklers, according to methods of controlling the elevation angle of a nozzle, controlling the rotational angle, and the number of nozzles.

It is important to select an appropriate head at the time of designing a sprinkler. In addition, a water pressure and water quantity, a tube material and specification, a sprinkling region, etc., have to be sufficiently considered. Such a sprinkler facility can be used for spraying medicines and liquid manure in addition to the drought counterplan.

In the meantime, the sprinklers are widely used as a fire-fighting facility as they are installed on ceilings of buildings or architectural structures so that a large amount of water can be sprayed besides the above-described agricultural purpose.

In fact, it can be seen that sprinklers are installed on ceilings of most of dwelling or business buildings, one by one per several or several tens square meters. Most of the sprinklers which are installed on the ceilings of buildings or structures are connected with fire detectors. Thus, when a fire breaks out, the sprinklers spray water from the ceilings to the floors, to thus repress the fire.

The sprinklers are gradually applied in practice and popularized to thereby be obligatorily installed. In order to install sprinklers, a main feed water tube which supplies water to the inside of a ceiling is set up, and a plurality of branch feed water tubes are united with the main feed water tube, so that the sprinklers are connected with the branch feed water tubes via connection tubes.

In the meantime, flexible joints which are flexibly bent and made of metal are recently being used in order to connect the above-described branch feed water tubes and the sprinklers to provide water for the sprinklers.

In order to flexibly bend the flexible joints, the outer circumference of each flexible joint crinkles in a spiral shape. In addition, in order to prevent a tubular body from being damaged due to a pressure when high-pressure water flows, the outer circumference of the flexible joint is made to contact a guard net which is adamantly fixed via a locking ring. In one end of each flexible joint is installed a connection tube which is called a reducer to which a sprinkler is fixed.

The technologies about a structure of fixing a sprinkler for ceiling construction or a structure of fixing a reducer for a sprinkler for ceiling construction are disclosed in the Korean Utility-model Registration Nos. 20-0274207 (Apr. 22, 2002), 20-0269740 (Mar. 14, 2002) and Korean Patent Registration No. 10-0359442 (Oct. 21, 2002), of which the representative drawings are each illustrated in FIGS. 1 through 3.

In FIG. 1, a reducer 1 is installed on a ceiling (not shown) through a vertical plane 2b of a fixed bracket 2. In order to adjust the installation height of the reducer 1 at the installed state, an adjustment screw 4 which faces downwards from the ceiling can be tightened or loosened. Then, the adjustment screw 4 screw-operates between the screw threads of the fixed bracket 2 and a lock-guide 1a of the reducer 1 moves along the fixed bracket 2. Simultaneously, the reducer 1 where the adjustment screw 4 is fixed moves along the guide hole of the fixed bracket 2 which is fixed on a ceiling up and down. In this case, since the adjustment screw 4 which faces downwards from the ceiling can be very easily tightened or loosened, the installation height of the reducer 1 can be controlled only by manipulation of the adjustment screw 4.

In FIG. 2, the adjustment screw 14 can be rotated at an in-situ place, at the state where the adjustment screw 14 has been put on upper and lower stoppers (not shown) in a combining aperture (not shown) of a guide projection 11a, but the lower portion of the adjustment screw 14 maintains the state where it has been screw-coupled with a screw hole 12a of a bracket 12. Therefore, the guide projection 11a ascends and descends along a guiding hole 12b in the case of a tube fitting 11 (corresponding to a reducer of FIG. 1) and thus, it is possible to control the position of the tube fitting 11.

In FIG. 3, the configuration of FIG. 3 is nearly similar to that of FIG. 2. That is, the adjustment screw 24 is screw-coupled with a protrusion 21a of a reducer 21 and the one-side end 22a of a bracket 22. Therefore, if the adjustment screw 24 is rotated in a forward or reverse direction, the reducer 21 ascends and descends along the guiding hole 22b of the bracket 22 based on the screw combination structure of the adjustment screw 24.

However, the disclosed prior art references show only the structure for fixing a reducer for a sprinkler which is installed on a ceiling but the sprinkler cannot be mounted on the other wall other than the ceiling, for example, a side wall. That is, the sprinklers cannot be mounted on side walls through the existing devices which are disclosed in the above-described gazettes. This is because the structure of the bracket or the reducer disclosed in each gazettes does not fit well for the side wall construction.

In the meantime, in most of countries sprinklers are adopted as the fire-fighting facility. Particularly, in the U.S.A. or some countries in Europe, the structure that sprinklers are mounted on side walls is used.

However, it is not possible to mount the sprinklers on the side walls by applying only the construction of mounting the sprinklers on the ceiling as disclosed in the above prior art. Therefore, there is a need to develop a reducer fixing structure for a sprinkler for side wall construction in consideration of the case where sprinklers are mounted on the side walls.

SUMMARY OF THE INVENTION

To solve the above conventional problems, it is an object of the present invention to provide a structure for fixing a reducer for a sprinkler in side wall construction, in which since the reducer is configured to easily adjust a distance from a side wall in the vertical direction as well as in the horizontal direction, a connection work between the reducer and a sprinkler head for the side wall construction connected to the reducer can be conveniently performed and the intensity of the reducer fixing structure can be reinforced.

To accomplish the above object of the present invention, according to an aspect of the present invention, there is provided a structure for fixing a reducer for a sprinkler in side wall construction, the reducer fixing structure comprising:

a bracket including a first transverse portion having an elongated hole formed in order to be fixed on a ceiling with at least one fixing member, a first longitudinal portion which is bent perpendicularly with the first transverse portion at one end of the first transverse portion, a second transverse portion which is formed in parallel with the first transverse portion on the bottom of the first longitudinal portion, in which a rail hole is formed in the plate surface thereof, and a second longitudinal portion is formed in parallel with the first longitudinal portion at the end part of the second transverse portion, in which a screw tap is formed in the plate surface thereof and simultaneously a through-hole is formed in one side of the rail hole;

a reducer including a rail block which is formed into a linear type tubular body with one end of which a flexible tube is combined and with the other end of which the head of the sprinkler for side wall construction is combined, and which is arranged in parallel with the second transverse portion at the lower portion of the second transverse portion, and is protruded from the upper-center portion of the reducer, in which sliding grooves formed in the rail block are engaged with a rail hole formed at the second transverse portion to thereby allow the rail block to move in the form of a rail, and a plate which is arranged in parallel with the second longitudinal portion at the location spaced from the rail block, in which a through-hole is formed in the plate surface; and an adjusting bolt which is inserted into the through-hole of the plate and is screwed into a screw tap of the second longitudinal portion, to thus enable the reducer to reciprocate in the direction which is in parallel with the second transverse portion during forward and backward rotation.

Here, an edge portion for the strength reinforcement can be formed in the bracket.

Moreover, the first longitudinal portion of the bracket is formed of two unit parts which are mutually separated in order to be controlled lengthily, and an elongated hole portion is formed in two unit parts, respectively, and at least one screw which is connected to a spot in which the elongated holes coincide at a process where the two unit parts are length-controlled to thereby fix the two unit parts.

According to another aspect of the present invention, there is provided a structure for fixing a reducer for a sprinkler in side wall construction, the reducer fixing structure comprising:

a bracket including a first transverse portion having an elongated hole formed in order to be fixed on a ceiling with at least one fixing member. a first longitudinal portion which is bent perpendicularly with the first transverse portion at one end of the first transverse portion, a second transverse portion which is formed in parallel with the first transverse portion on the bottom of the first longitudinal portion, in which a rail hole is formed in the plate surface thereof, and simultaneously a through-hole is formed in one side of the rail hole, and a second longitudinal portion is formed in parallel with the first longitudinal portion at the end part of the second transverse portion, in which a screw tap is formed in the plate surface thereof;

a reducer including a rail block which is formed into a linear type tubular body with one end of which a flexible tube is combined and with the other end of which the head of the sprinkler for side wall construction is combined, and which is arranged in parallel with the second transverse portion at the lower portion of the second transverse portion, and is protruded from the upper-center portion of the reducer, in which sliding grooves formed in the rail block are engaged with a rail hole formed at the second transverse portion to thereby allow the rail block to move in the form of a rail; and an adjusting bolt which is inserted into the through-hole of the second longitudinal portion and is screwed into a screw tap of the rail block, to thus enable the reducer to reciprocate in the direction which is in parallel with the second transverse portion during forward and backward rotation.

Here, an edge portion for the strength reinforcement can be formed in the bracket.

According to still another aspect of the present invention, there is provided a structure for fixing a reducer for a sprinkler in side wall construction, the reducer fixing structure comprising:

a bracket including a first transverse portion having an elongated hole formed in order to be fixed on a ceiling with at least one fixing member. a first longitudinal portion which is bent perpendicularly with the first transverse portion at one end of the first transverse portion, and simultaneously a through-hole with which a rail block is fitted is formed, a second transverse portion which is formed in parallel with the first transverse portion on the bottom of the first longitudinal portion, in which a rail hole is formed in the plate surface thereof, and a second longitudinal portion is formed in parallel with the first longitudinal portion at the end part of the second transverse portion, in which a through-hole is formed in the plate surface thereof;

a reducer including a rail block which is formed into a linear type tubular body with one end of which a flexible tube is combined and with the other end of which the head of the sprinkler for side wall construction is combined, and which is arranged in parallel with the second transverse portion at the lower portion of the second transverse portion, and is protruded from the upper-center portion of the reducer, in which sliding grooves formed in the rail block are engaged with a rail hole formed at the second transverse portion to thereby allow the rail block to move in the form of a rail; and an adjusting bolt which is inserted into the through-hole of the second longitudinal portion and is screwed into a screw tap of the rail block, to thus enable the reducer to reciprocate in the direction which is in parallel with the second transverse portion during forward and backward rotation.

BRIEF DESCRIPTION OF DRAWINGS

The above and other objects and advantages of the present invention will become more apparent by describing the preferred embodiment thereof in more detail with reference to the accompanying drawings in which.

DETAILED DESCRIPTION OF THE INVENTION

Figure 1:
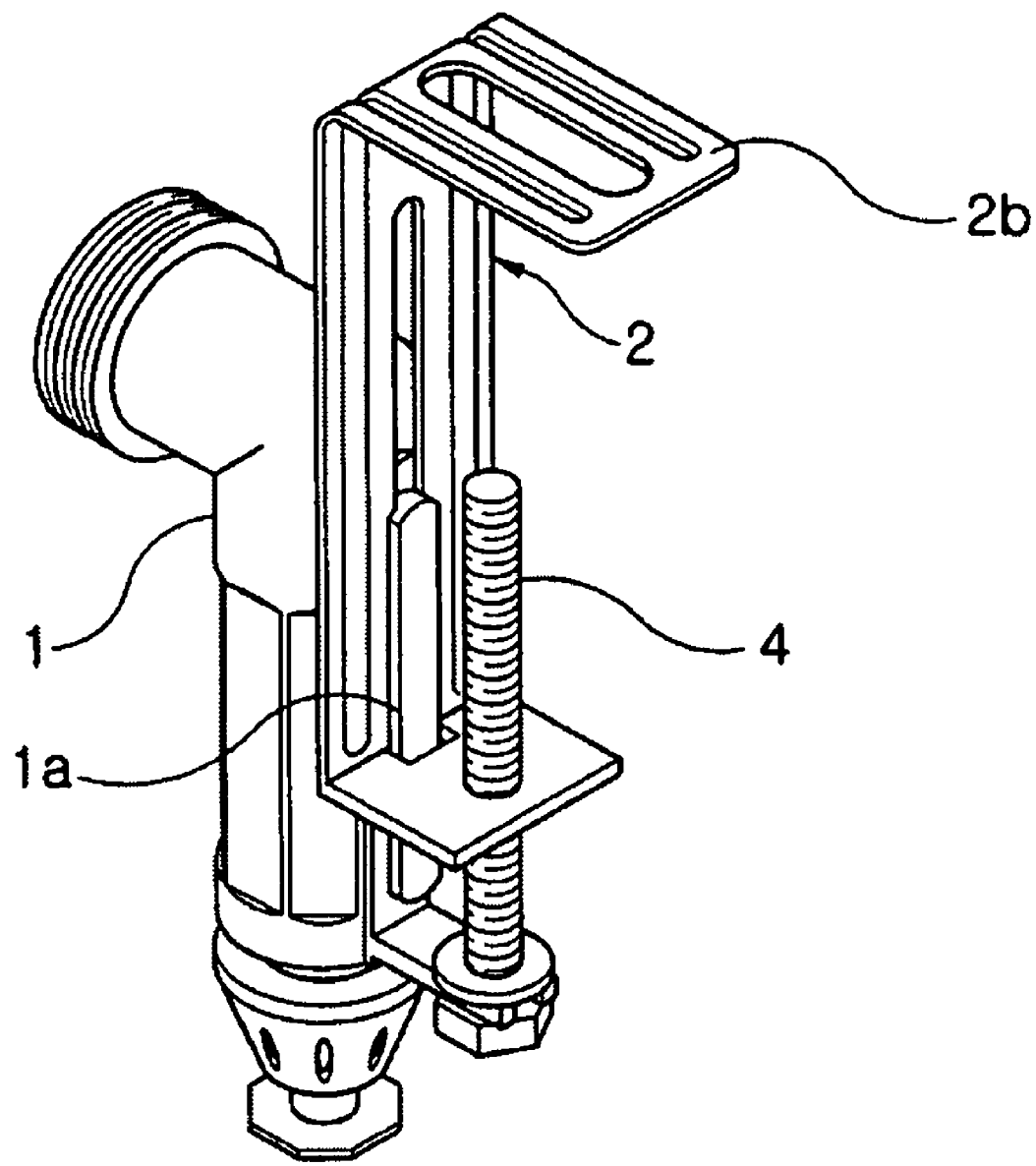
FIGS. 1 through 3 are views showing a conventional structure for fixing a reducer for a sprinkler for ceiling construction, respectively.
Figure 2:
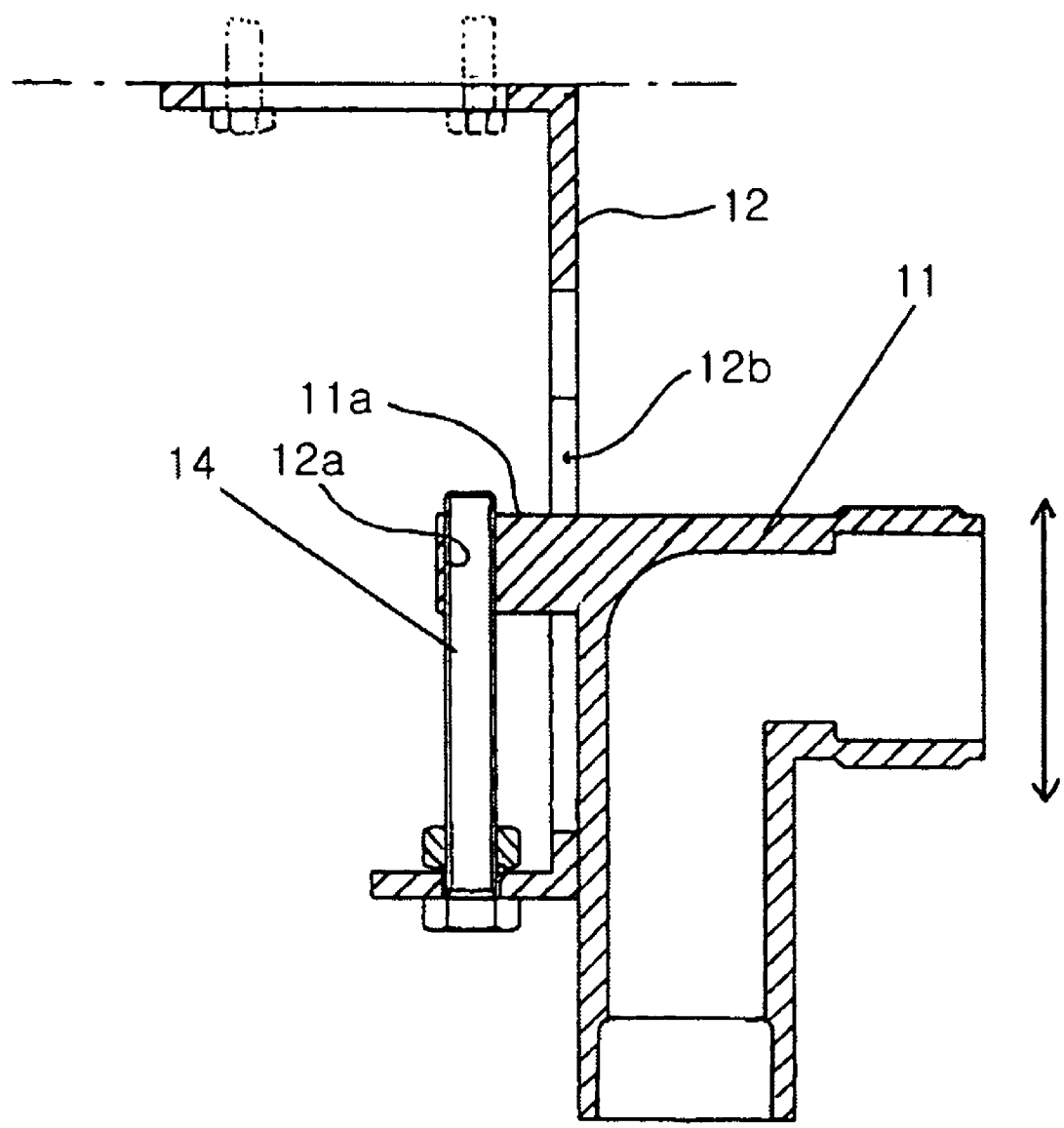
Figure 3:
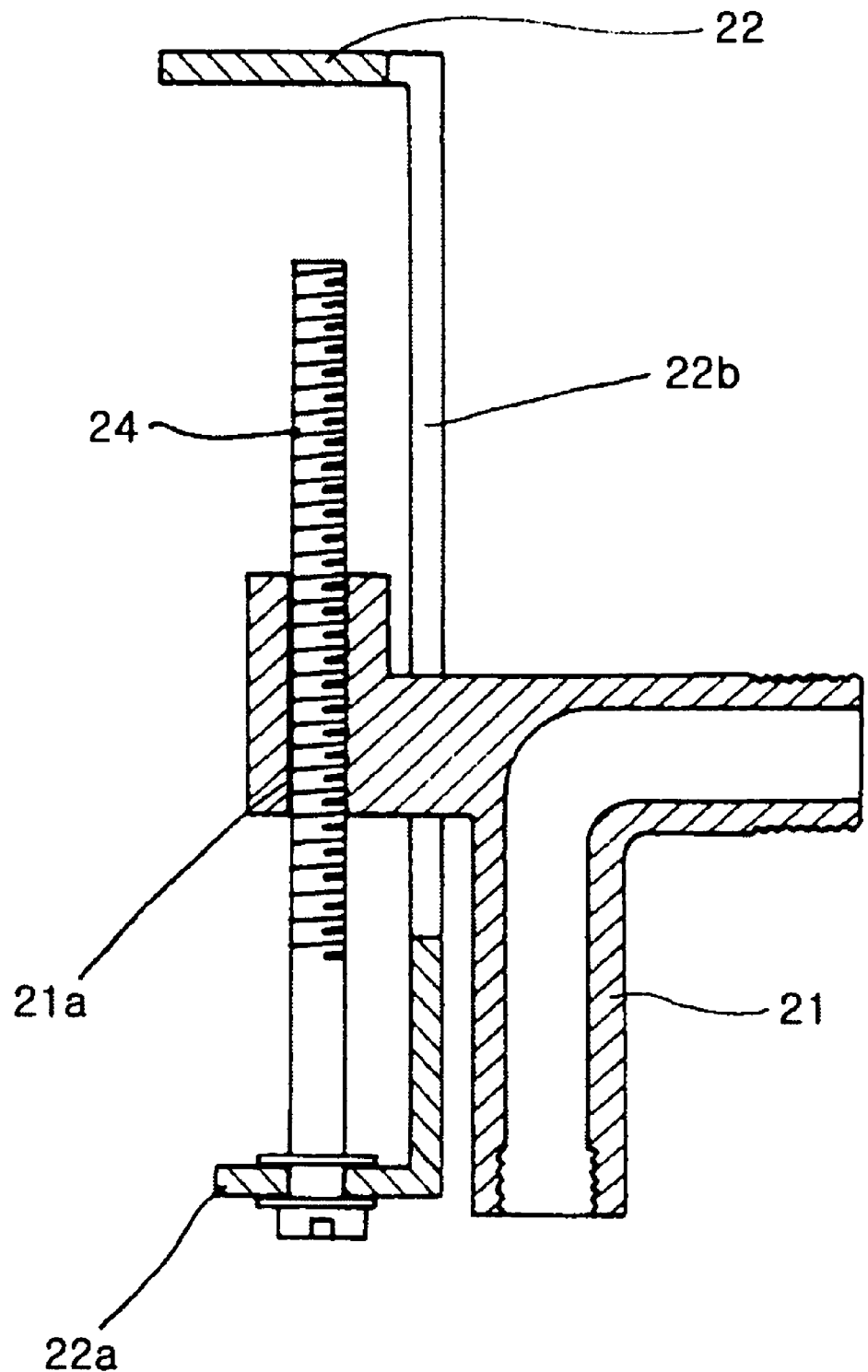

Hereinafter, a structure for fixing a reducer for a sprinkler for side wall construction according to a preferred embodiment of the present invention will be described with reference to the accompanying drawings. In the description, like reference numerals denote like elements.

Figure 4A:
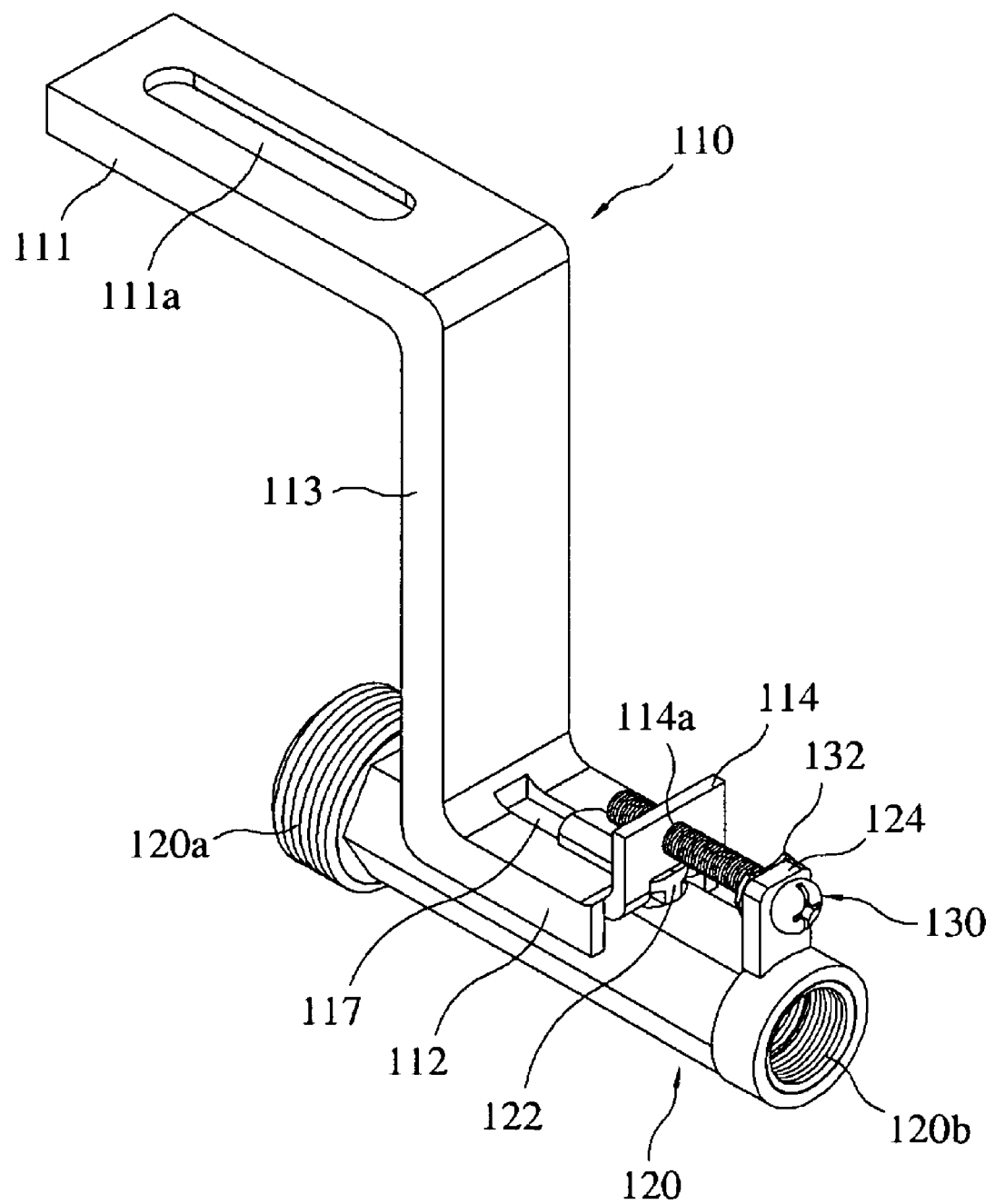
FIG. 4A is a perspective view showing a structure for fixing a reducer for a sprinkler for side wall construction according to a first preferred embodiment of the present invention.
Figure 4B:
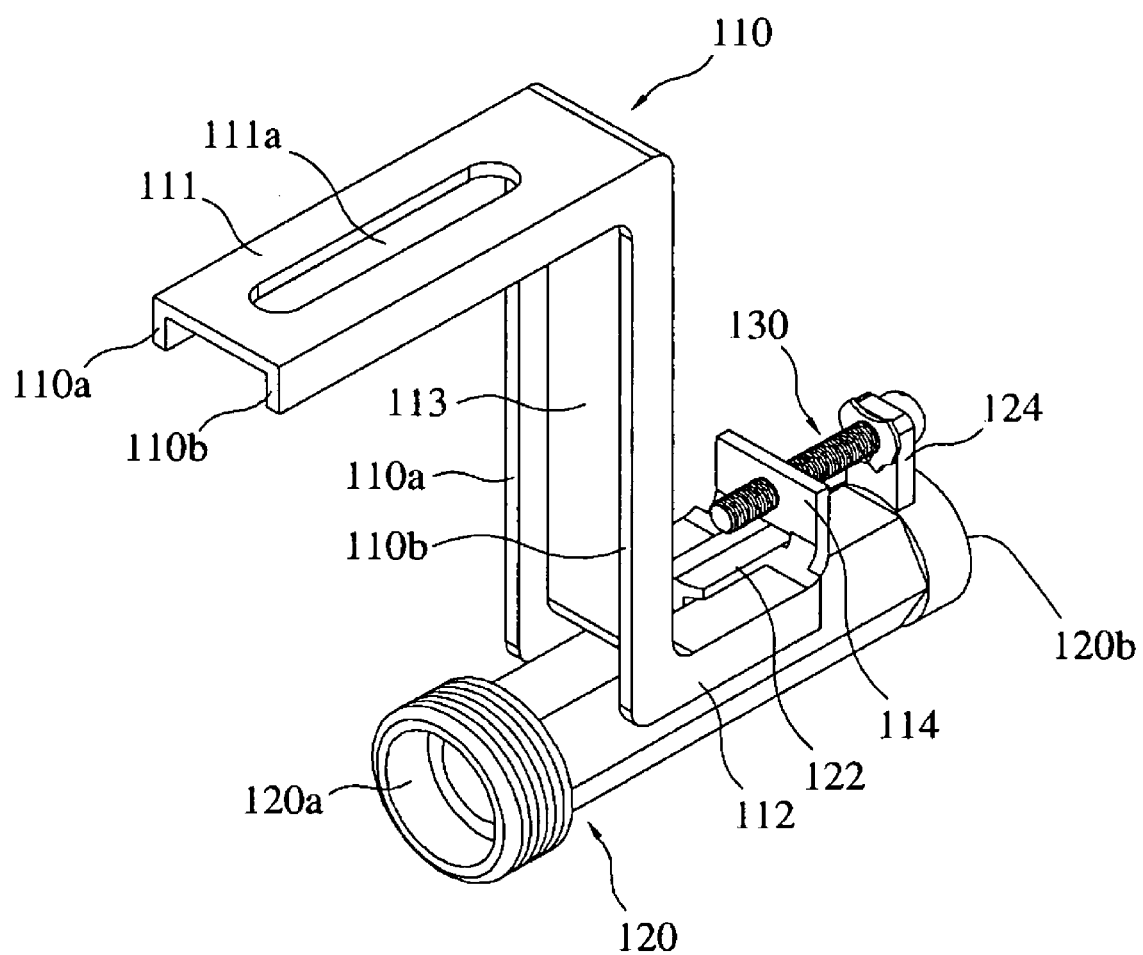
FIG. 4B is a perspective view showing the structure for fixing a reducer for a sprinkler for side wall construction of FIG. 4A, which is viewed in another direction.
Figure 4C:
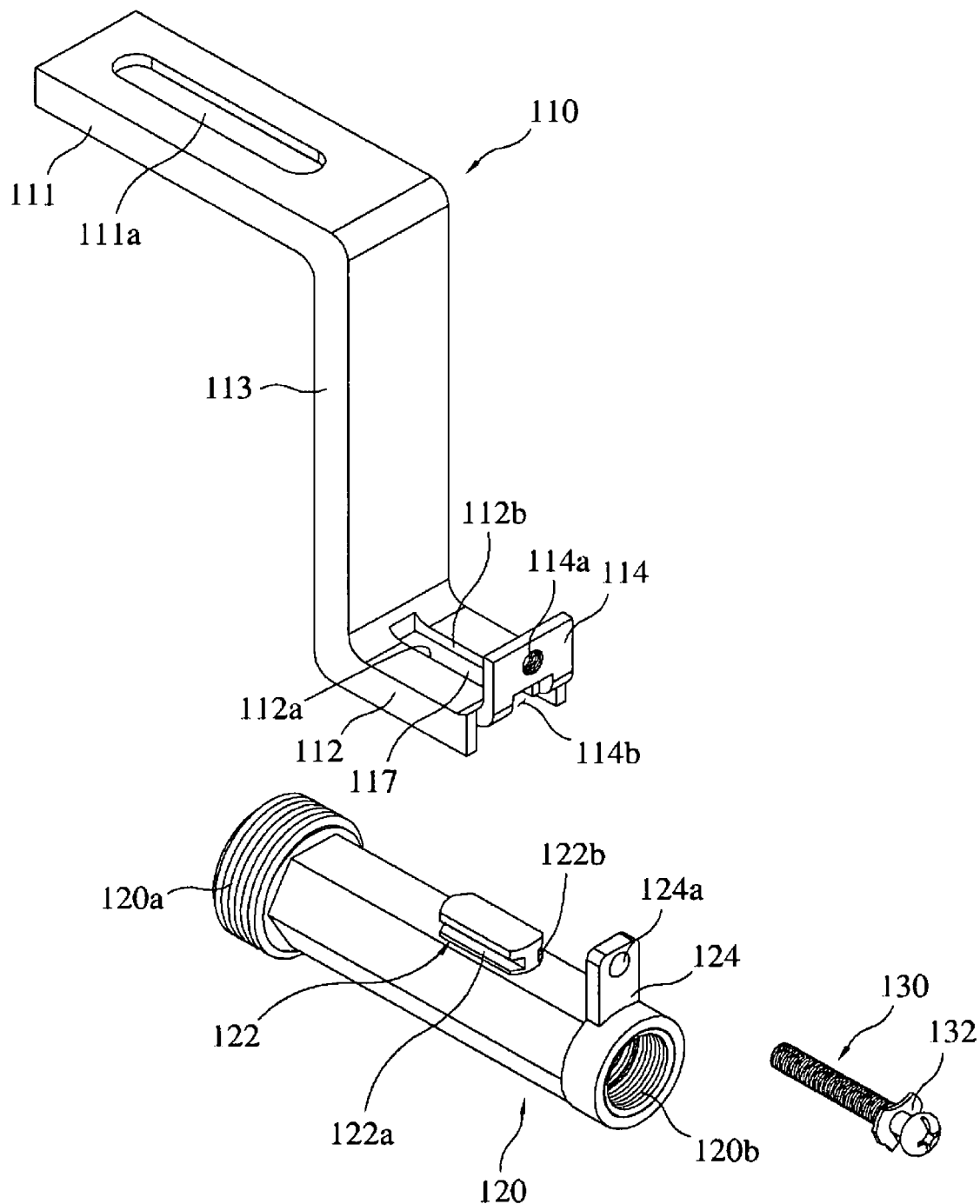
FIG. 4C is a disassembled perspective view showing the structure for fixing a reducer for a sprinkler for side wall construction of FIG. 4A.
Figure 4D:
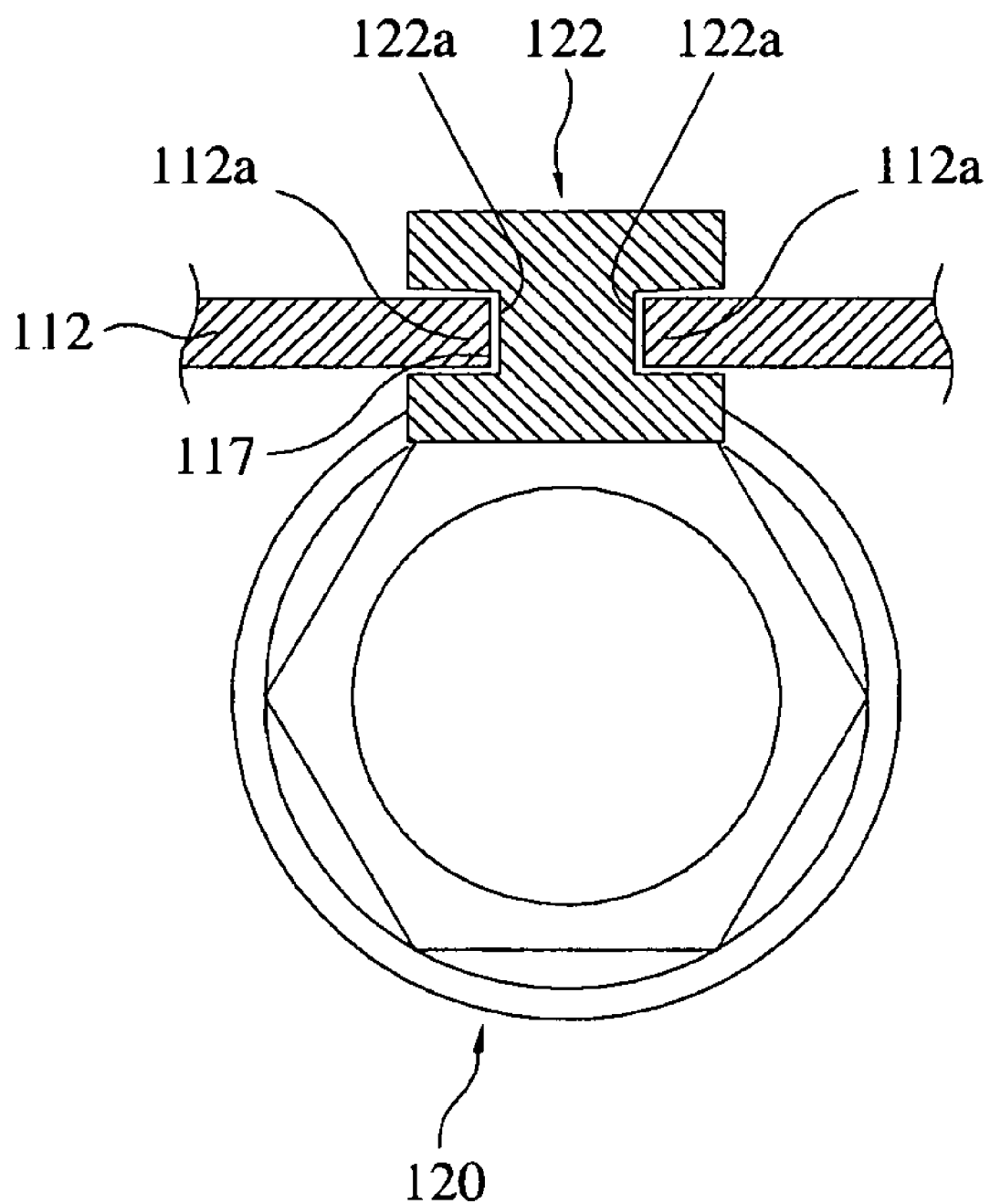
FIG. 4D is a schematic cross-sectional view of a rail block portion shown in FIG. 4A.
Figure 5A:
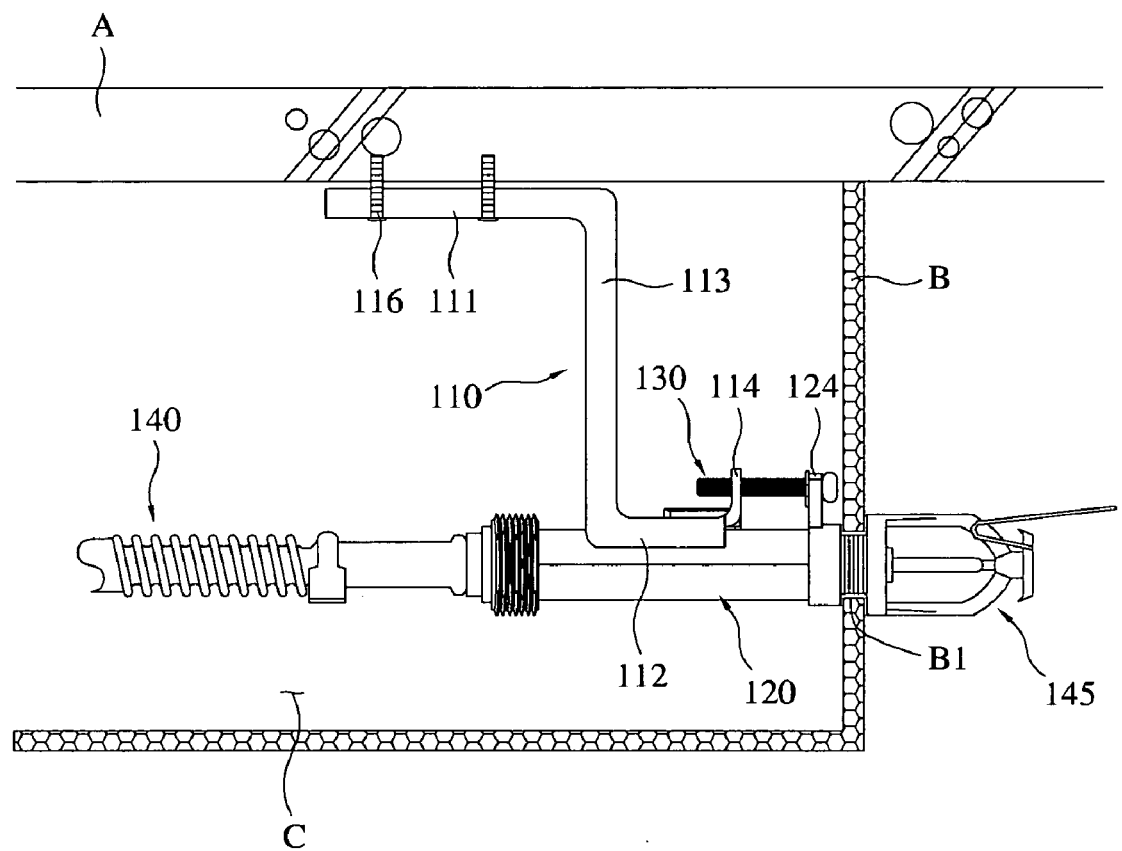
FIG. 5A is a sectional view showing the state where the structure for fixing a reducer for a sprinkler for side wall construction of FIG. 4A has been constructed.
Figure 5B:
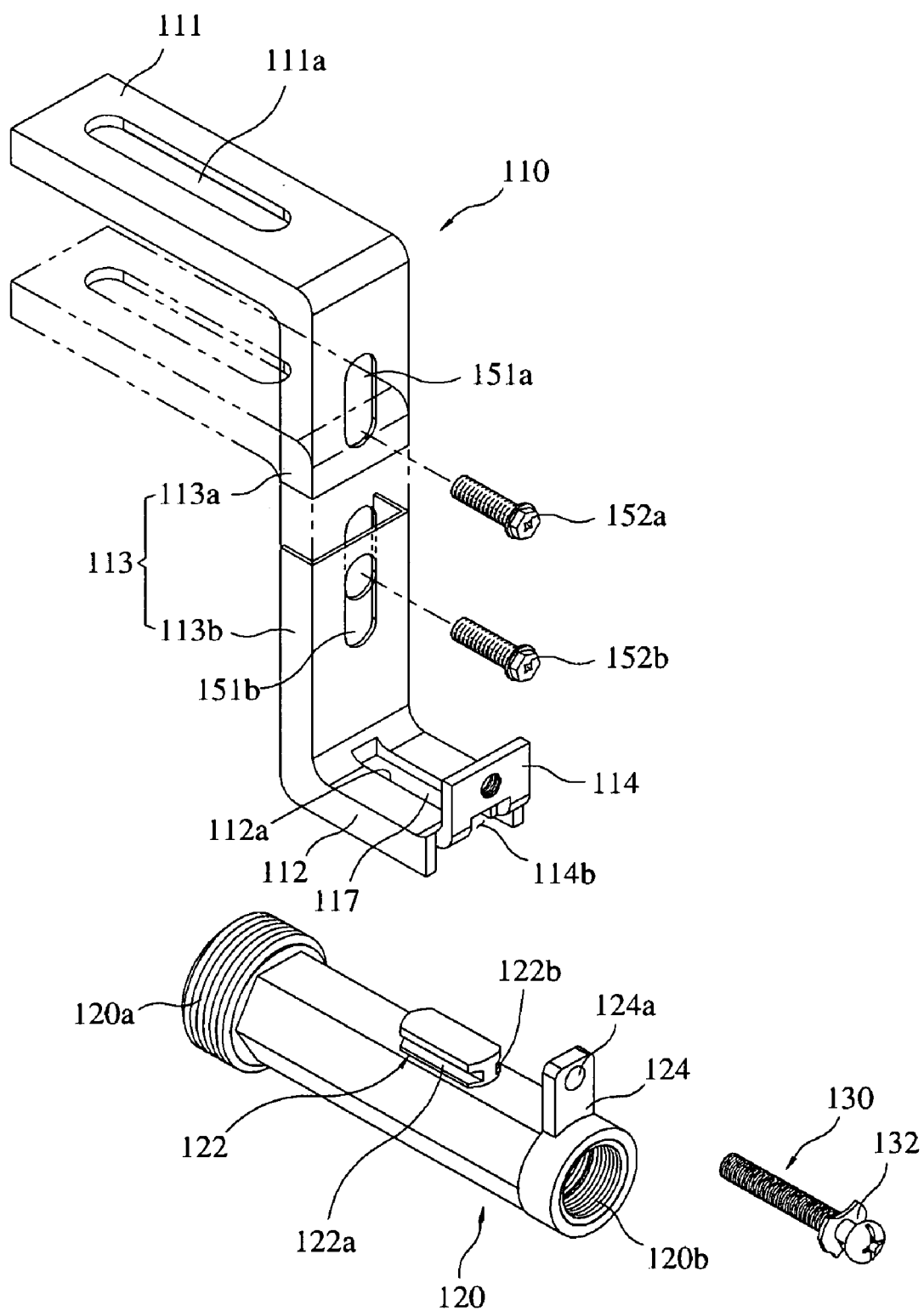
FIG. 5B is a perspective view showing a modified first longitudinal portion which is applied in the reducer fixed structure of the sprinkler for the side wall construction according to the first preferred embodiment of the present invention.

FIG. 4A is a perspective view showing a structure for fixing a reducer for a sprinkler for side wall construction according to a first preferred embodiment of the present invention. FIG. 4B is a perspective view showing the structure for fixing a reducer for a sprinkler for side wall construction of FIG. 4A, which is viewed in another direction. FIG. 4C is a disassembled perspective view showing the structure for fixing a reducer for a sprinkler for side wall construction of FIG. 4A. FIG. 4D is a schematic cross-sectional view of a rail block portion shown in FIG. 4A. FIG. 5A is a sectional view showing the state where the structure for fixing a reducer for a sprinkler for side wall construction of FIG. 4A has been constructed. FIG. 5B is a perspective view showing a modified first longitudinal portion which is applied in the reducer fixed structure of the sprinkler for the side wall construction according to the first preferred embodiment of the present invention.

Referring to FIGS. 4A through 5B, a structure for fixing a reducer for a sprinkler in side wall construction, according to a first preferred embodiment of the present invention includes a bracket 110, a reducer 120, and an adjusting bolt 130.

In addition to a flexible tube 140 to be described later, the bracket 110, the reducer 120 and the adjusting bolt 130 are mounted in an internal space "C" of a side wall "B," and only a head 145 of the sprinkler is exposed and suspended to the outer side of the side wall "B." The respective structures will be described below in detail.

The bracket 110 includes first and second transverse portions 111 and 112, and first and second longitudinal portions 113 and 114. The bracket 110 including the first and second transverse portions 111 and 112 and the first and second longitudinal portions 113 and 114 can be integrally formed of a metal material.

However, since the protection scope of the present invention is not limited to thereto, the first and second transverse portions 111 and 112 and the first and second longitudinal portions 113 and 114 can be individually manufactured, respectively, and then mutually assembled. An assembly method such as welding can be applied during assembling the first and second transverse portions 111 and 112 and the first and second longitudinal portions 113 and 114 if they are made of the metal material.

Here, the metal material mentioned indicates a material which is not substantially easily corroded, for example, a material such as stainless steel and aluminum. However, it can be replaced with engineering plastics if the intensity can suffice.

The bracket 110 may be formed of a linear type metal plate having a certain thickness. However, in this preferred embodiment, the bracket 110 is manufactured to have edge portions 110a and 110b for the strength reinforcement. That is, as shown in FIG. 4B, the bracket 110 has a U-shaped form in which the edge portions 110a and 110b for reinforcement are bent at both sides of the bracket 110. In this case, when compared with the case where the linear type metal plate is used, the bracket 110 having the edge portions 110a and 110b for the strength reinforcement has the advantage of reinforcing the intensity much more. Edge portions 110a and 110b for enforcement can be formed over the whole bracket 110, or can be formed only at a desired portion of the bracket 110.

The first transverse portion 111 is a portion which is fixed on the ceiling "A" with a plurality of fixing members 116, and is used as a portion which substantially supports the bracket 110 on the ceiling "A." A bolt can be used as the fixing member 116. An elongated hole 111a through which the fixing member 116 passes is formed in the plate surface of the first transverse portion 111, for the passage of a bolt. Like this, since the elongated hole 111a is formed, a fastening work of the fixing member 116 is advantageously performed more smoothly and easily. In the drawings, two bolts are used to fix the first transverse portion 111 on the ceiling "A" but it is nothing but one embodiment.

The first longitudinal portion 113 is formed perpendicularly with the first transverse portion 111, at one end of the first transverse portion 111. The first longitudinal portion 113 is formed in order to adjust a distance between the reducer 120 and the ceiling "A." That is, in the case that the length of the first longitudinal portion 113 is long, the reducer 120 can be disposed at a remote distance downwards from the ceiling "A" and if the length of the first longitudinal portion 113 is short, the reducer 120 can be arranged adjacent to the ceiling "A." Therefore, the length of the first longitudinal portion 113 can be appropriately design-changed according to the situation of the construction site, that is, sprinklers are installed, unlike the illustrated manner.

The second transverse portion 112 is formed in parallel with the first transverse portion 111, on the bottom of the first longitudinal portion 113. In the case of the present preferred embodiment, the second transverse portion 112 is formed shorter in comparison with the first transverse portion 111. A rail hole 117 is penetratively formed in the plate surface of the second transverse portion 112. The rail hole 117 is utilized as a space engaging with the rail block 122 of the reducer 120 to be described later. In the case that the reducer 120 reciprocates, the rail hole 117 plays a role of a guide in which the rail block 122 moves to be slidable. That is, the rail block 122 moves slidably along the rail hole 117 of an elongated hole form, on the whole, the reducer 120 can reciprocate.

Both side walls of the rail hole 117 form guide rails 112a and 112b with which sliding grooves 122a and 122b formed in both sides of the rail block 122 are engaged and which move slidably (see FIGS. 4C and 4D). That is, the sliding grooves 122a and 122b formed in both sides of the rail block 122 are engaged with the guide rails 112a and 112b formed in both side walls of the rail hole 117, and then move along the guide rails 112a and 112b, so that the reducer 120 reciprocates on the whole.

The second longitudinal portion 114 is in parallel with the first longitudinal portion 113, at the end of the second transverse portion 112. In the present preferred embodiment, the second longitudinal portion 114 is formed shorter in comparison with the first longitudinal portion 113. A screw tap 114a with which an adjusting bolt 130 is screwed is formed in the plate surface of the second longitudinal portion 114.

A through-hole 114a is further formed in this second longitudinal portion 114. The through-hole 114a is formed at a spot nearly contacting the second longitudinal portion 114 and the second transverse portion 112, and communicates with the rail hole 117 formed in the plate surface of the second transverse portion 112. The through-hole 114a is used as a path into which the rail block 122 formed in the reducer 120 is inserted in the lateral direction, that is, a path being combined with the bracket 110. Therefore, the through-hole 114a is penetratively formed greater than the volume of the rail block 122.

In the meantime, in the case of the prior art, reducers (not shown) have been nearly formed in a bent Γ-shaped form. The reason why the reducers (not shown) have been nearly formed in a bent Γ-shaped form as described above is to install the sprinkler head 145 on the ceiling "A."

However, since the sprinkler head 145 is installed on the side wall "B" in the present preferred embodiment, there is no need to apply the reducer 120 in the form of a Γ-shaped form. Thus, in this embodiment, a linear type reducer 120 is applied to the sprinkler head 145. The linear type reducer 120 is arranged in parallel with the second transverse portion 112 in the lower portion of the second transverse portion 112, and reciprocates by an adjusting bolt 130 along the lengthy direction of the second transverse portion 112. Here, the meaning that the reducer 120 reciprocates along the lengthy direction of the second transverse portion 112 means controlling an access of the reducer 120 to the side wall "B" and a separation distance between the reducer 120 and the side wall "B."

A flexible tube 140 through which water flows is combined at one end 120a of the linear type reducer 120 formed of a tubular body, and the sprinkler head 145 for construction of the side wall "B" is combined with the other end 120b. The flexible tube 140 indicates a tube having a characteristic of being easily bent or curved due to its own elastic feature.

A rail block 122 is formed in the upper-center portion of the linear type reducer 120 in which the rail block 122 which is protruded upwards from the corresponding position is engaged with the rail hole 117 formed in the second transverse portion 112 and moves along the rail. Here, as described above, a coupling between the rail hole 117 and the rail block 122 is accomplished with for example a dovetail coupling structure. Therefore, the rail block 122 is not arbitrarily separated from the rail hole 117.

A plate 124 which is protruded toward the bracket 110 at a location spaced from the rail block 122 and which is arranged in parallel with the second longitudinal portion 114, is further formed in the linear type reducer 120. A through-hole 124a through which an adjusting bolt 130 passes is formed in the plate surface of the plate 124. Here, the plate 124 is provided at one side end of the reducer 120 so that the second longitudinal portion 114 is positioned between the plate 124 and the first longitudinal portion 113.

The adjusting bolt 130 is an element which substantially moves the reducer 120. The adjusting bolt 130 is inserted into the through-hole 124a formed in the plate surface of the plate 124 and is screw-connected with a screw tap 114a of the second longitudinal portion 114. The adjusting bolt 130 plays a role of reciprocating the reducer 120 in a direction which is in parallel with the second transverse portion 112 at the time of forward or backward rotation. In order to suppress the adjusting bolt 130 from being arbitrarily separated, a bolt ring 132 is further provided in the adjusting bolt 130.

By this configuration, a method of installing the sprinkler head 145 on a side wall "B" will be briefly described.

Firstly, the rail block 122 formed in the reducer 120 is inserted through the through-hole 114b formed in the second longitudinal portion 114 of the bracket 110 in the lateral direction, and then sliding grooves 122a and 122b formed in both sides of the rail block 122 are engaged with guide rails 112a and 112b formed in both side walls of the rail hole 117. In this way, at the state of coupling the reducer 120 with the bracket 110, the first transverse portion 111 of the bracket 110 is arranged on the ceiling "A." The bolt which is the fixing member 116 is inserted into the elongated hole 111a and screw-coupled on the ceiling "A." Therefore, the bracket 110 becomes a state of hanging on the ceiling "A," and the other end 120b of the reducer 120 becomes a state of being positioned to be horizontal to the side wall hole B1 formed in the side wall "B."

Then, the flexible tube 140 is coupled with one end 120a of the reducer 120. The sprinkler head 145 is coupled with the other end 120b of the reducer 120 through the side wall hole B1 formed in the side wall "B." Accordingly, the sprinkler head 145 can be conveniently installed on the side wall "B."

If the other end 120b of the reducer 120 approaches too closely to the side wall hole B1 which is formed in the side wall "B" or the former is spaced too far from the latter, it is difficult to couple the sprinkler head 145 with the other end 120b of the reducer 120. As being the case, the reducer 120 is reciprocated in the direction which is in parallel with the second transverse portion 112, while rotating the adjusting bolt 130 in the forward or reverse direction. Thereafter, the sprinkler head 145 is coupled with the other end 120b of the reducer 120 if the other end 120b of the reducer 120 reaches an appropriate location. That is, if the adjusting bolt 130 is rotated in the forward or reverse direction, the reducer 120 can reciprocate in the direction which is in parallel with the second transverse portion 112 with respect to the bracket 110 fixed by the screw-connection of the screw tap 114a and the adjusting bolt 130. Here, the sliding grooves 122a and 122b formed in both sides of the rail block 122, move along the second guide rails 112a and 112b, at the state of being engaged with the second guide rails 112a and 112b formed in both side walls of the rail hole 117. Accordingly, on the whole, the reducer 120 can steadily reciprocate.

In this way, according to this embodiment, since the reducer 120 is configured to easily adjust a distance from the side wall "B" in the vertical direction as well as in the horizontal direction, a connection work between the reducer 120 and the sprinkler head 145 for the side wall "B" construction connected to the reducer 120 can be conveniently performed, and the intensity of the reducer fixing structure can be reinforced.

In the meantime, FIG. 5A is a sectional view showing the state where the structure for fixing a reducer for a sprinkler for side wall construction of FIG. 4A has been constructed, and FIG. 5B is a perspective view showing a modified first longitudinal portion which is applied in the reducer fixed structure of the sprinkler for the side wall construction according to the first preferred embodiment of the present invention.

In the case of the above-described first preferred embodiment, the length of the first longitudinal portion 113 is fixed at a predetermined state. Accordingly, it is difficult to adjust a distance between the ceiling "A" of FIG. 5A and the reducer 120. In this case, a level between the side wall hole B1 formed and the side wall "B" and the reducer 120 should be accurately matched. As a result, an inconvenient work may be caused.

Thus, as shown in FIG. 5B, if the length of the first longitudinal portion 113 can be controlled, the distance from the ceiling "A" to the reducer 120 can be easily controlled based upon the working site.

The method for controlling the length of the first longitudinal portion 113 can be variously performed. However, after the first longitudinal portion 113 is divided into the two unit parts 113a and 113b in this modified embodiment, the elongated hole portions 151a and 151b are formed in each unit part 113a or 113b. In addition, this modified embodiment exemplifies the structure of screw-coupling a plurality of screws 152a and 152b at a spot with which the elongated hole parts 151a and 151b coincide at the process where two unit parts 113a and 113b are length-controlled reciprocally.

By this structure, the length of the first longitudinal portion 113 can be controlled. Accordingly, the distance from the ceiling "A" to the reducer 120 can be easily controlled based upon the working site, to thus provide an effect of allowing a work to facilitate. Here, the length adjustment of the first longitudinal portion 113 has been described only with respect to the first preferred embodiment, but the same structure as that of the of first preferred embodiment can be applied to second and third preferred embodiments to be described later.

Figure 6A:
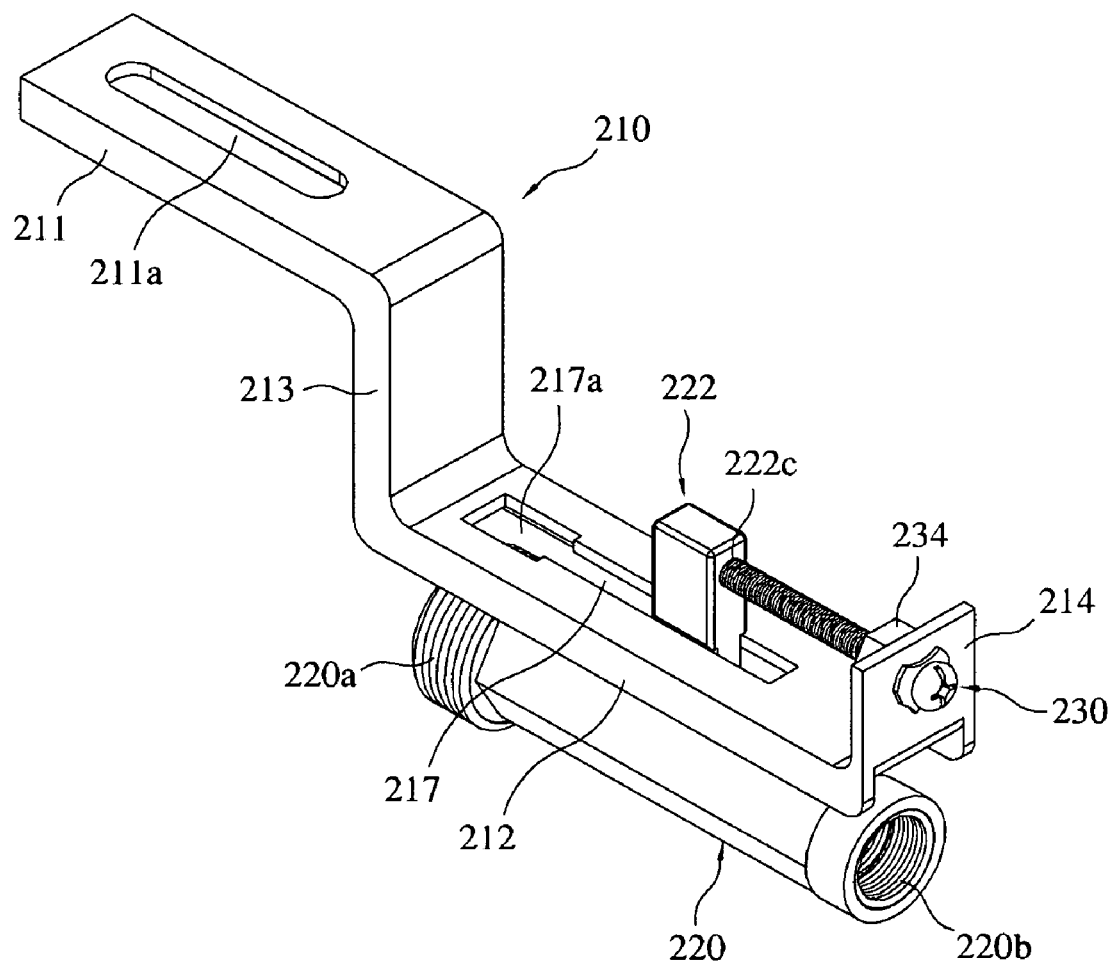
FIG. 6A is a perspective view showing a structure for fixing a reducer for a sprinkler for side wall construction according to a second preferred embodiment of the present invention.
Figure 6B:
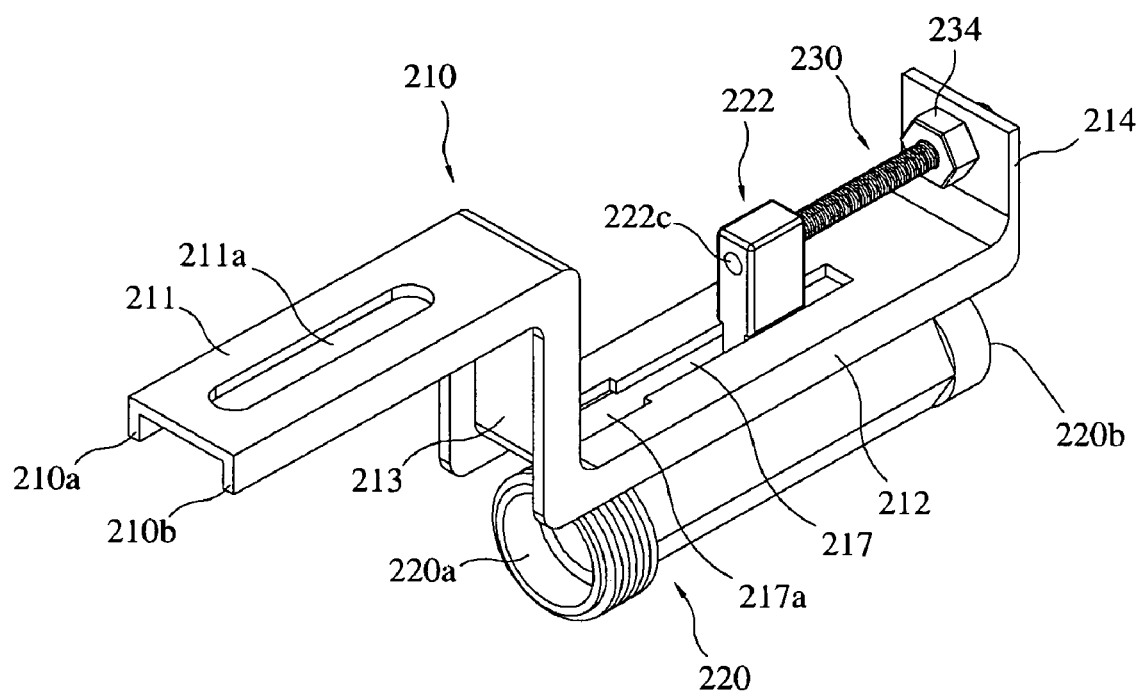
FIG. 6B is a perspective view showing the structure for fixing a reducer for a sprinkler for side wall construction of FIG. 6A, which is viewed in another direction.
Figure 6C:
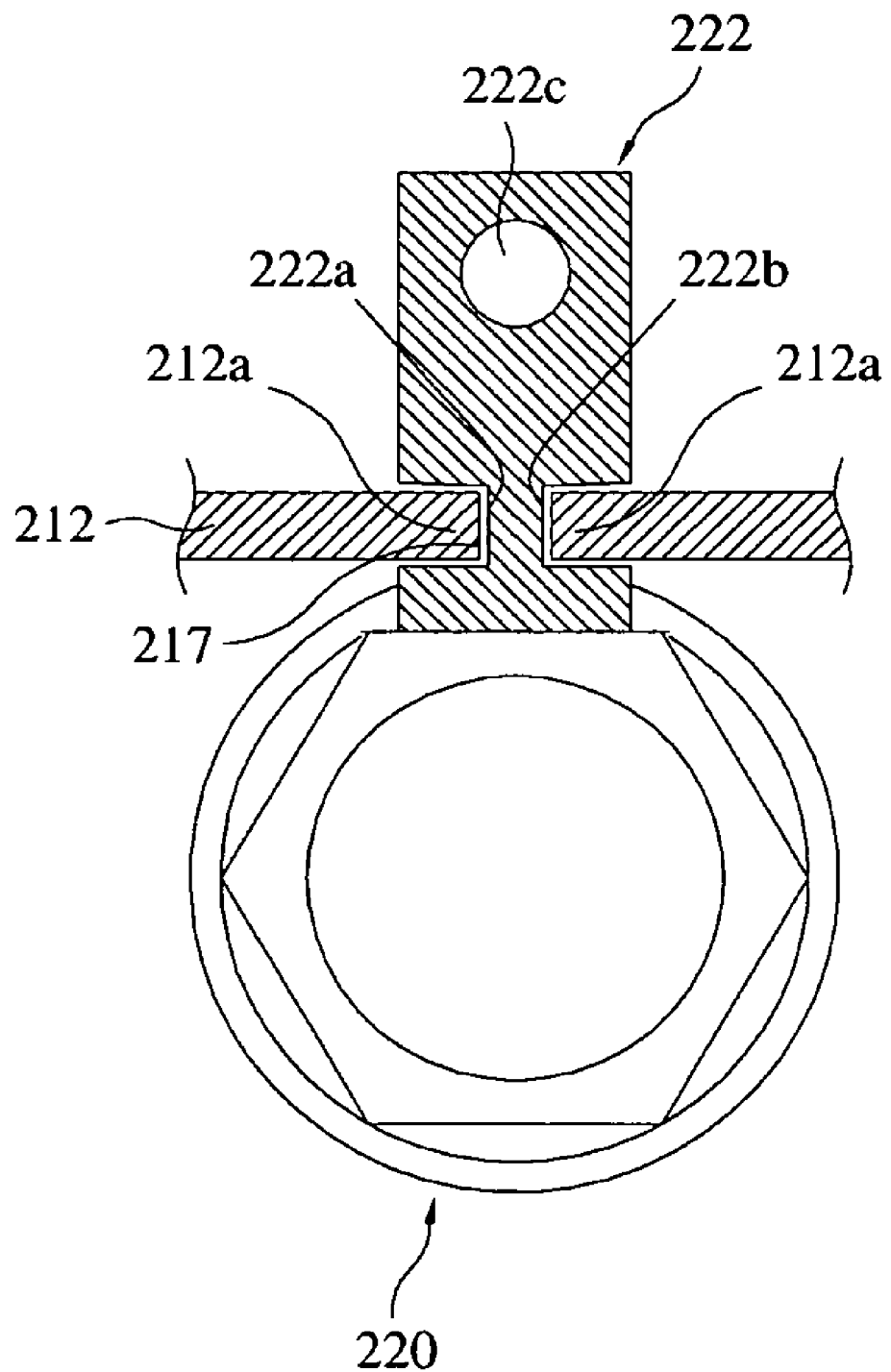
FIG. 6C is a schematic cross-sectional view of a rail block portion shown in FIG. 6A.

FIG. 6A is a perspective view showing a structure for fixing a reducer for a sprinkler for side wall construction according to a second preferred embodiment of the present invention. FIG. 6B is a perspective view showing the structure for fixing a reducer for a sprinkler for side wall construction of FIG. 6A, which is viewed in another direction. FIG. 6C is a schematic cross-sectional view of a rail block portion shown in FIG. 6A.

Figure 7:
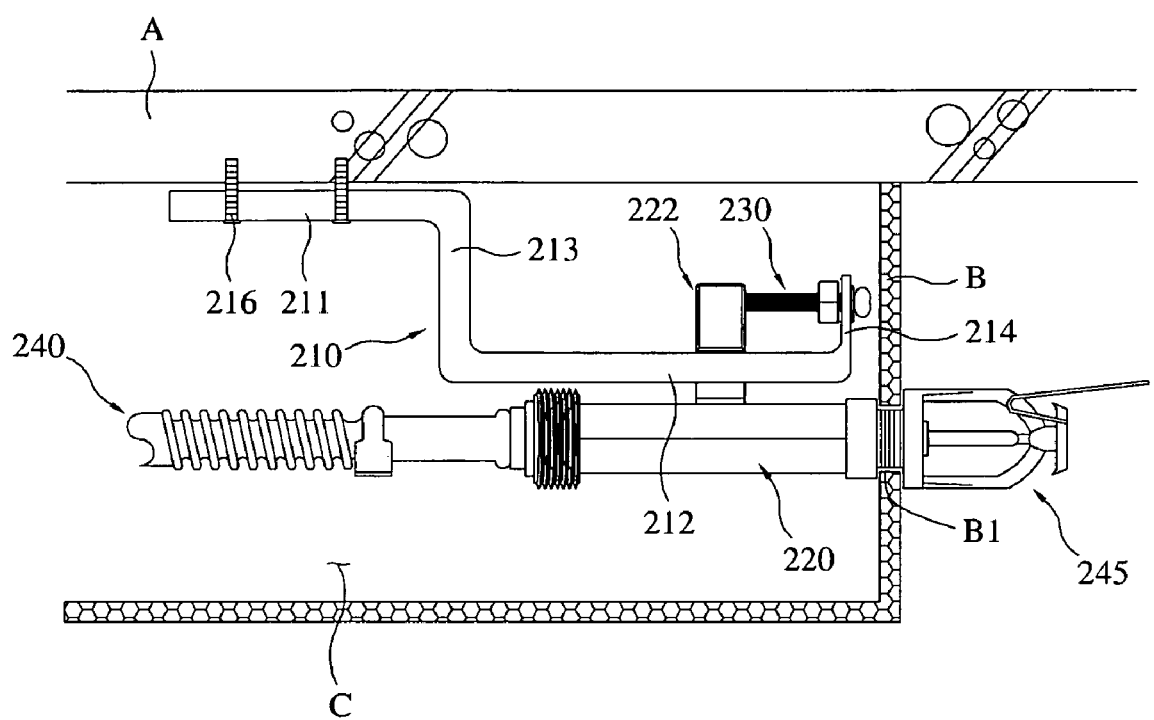
FIG. 7 is a sectional view showing the state where the structure for fixing a reducer for a sprinkler for side wall construction of FIGS. 6A and 6B has been constructed.

FIG. 7 is a sectional view showing the state where the structure for fixing a reducer for a sprinkler for side wall construction of FIGS. 6A and 6B has been constructed.

Referring to FIGS. 6A through 7, a structure for fixing a reducer for a sprinkler in side wall construction, according to a second preferred embodiment of the present invention includes a bracket 210, a reducer 220, and an adjusting bolt 230.

In addition to a flexible tube 240 to be described later, the bracket 210, the reducer 220 and the adjusting bolt 230 are mounted in an internal space "C" of a side wall "B," and only a head 145 of the sprinkler is exposed and suspended to the outer side of the side wall "B." The respective structures will be described below in detail.

The bracket 210 includes first and second transverse portions 211 and 212, and first and second longitudinal portions 213 and 214. The bracket 210 including the first and second transverse portions 211 and 212 and the first and second longitudinal portions 213 and 214 can be integrally formed of a metal material.

However, since the protection scope of the present invention is not limited to thereto, the first and second transverse portions 211 and 212 and the first and second longitudinal portions 213 and 214 can be individually manufactured, respectively, and then mutually assembled. An assembly method such as welding can be applied during assembling the first and second transverse portions 211 and 212 and the first and second longitudinal portions 213 and 214 if they are made of the metal material.

Here, the metal material mentioned indicates a material which is not substantially easily corroded, for example, a material such as stainless steel and aluminum. However, it can be replaced with engineering plastics if the intensity can suffice.

The bracket 210 may be formed of a linear type metal plate having a certain thickness. However, in this preferred embodiment, the bracket 210 is manufactured to have edge portions 210a and 210b for the strength reinforcement. That is, as shown in FIG. 6B, the bracket 210 has a U-shaped form in which the edge portions 210a and 210b for reinforcement are bent at both sides of the bracket 210. In this case, when compared with the case where the linear type metal plate is used, the bracket 210 having the edge portions 210a and 210b for the strength reinforcement has the advantage of reinforcing the intensity much more. Edge portions 210a and 210b for enforcement can be formed over the whole bracket 210, or can be formed only at a desired portion of the bracket 210.

The first transverse portion 211 is a portion which is fixed on the ceiling "A" with a plurality of fixing members 216, and is used as a portion which substantially supports the bracket 210 on the ceiling "A." A bolt can be used as the fixing member 216. An elongated hole 211a through which the fixing member 216 passes is formed in the plate surface of the first transverse portion 211, for the passage of a bolt. Like this, since the elongated hole 211a is formed, a fastening work of the fixing member 216 is advantageously performed more smoothly and easily. In the drawings, two bolts are used to fix the first transverse portion 211 on the ceiling "A" but it is nothing but one embodiment.

The first longitudinal portion 213 is formed perpendicularly with the first transverse portion 211, at one end of the first transverse portion 211. The first longitudinal portion 213 is formed in order to adjust a distance between the reducer 220 and the ceiling "A." That is, in the case that the length of the first longitudinal portion 213 is long, the reducer 220 can be disposed at a remote distance downwards from the ceiling "A" and if the length of the first longitudinal portion 213 is short, the reducer 220 can be arranged adjacent to the ceiling "A." Therefore, the length of the first longitudinal portion 213 can be appropriately design-changed according to the situation of the construction site, that is, sprinklers are installed, unlike the illustrated manner.

The second transverse portion 212 is formed in parallel with the first transverse portion 211, on the bottom of the first longitudinal portion 213. In the case of the present preferred embodiment, the second transverse portion 212 is formed shorter in comparison with the first transverse portion 211. A rail hole 217 is penetratively formed in the plate surface of the second transverse portion 212. The rail hole 217 is utilized as a space engaging with the rail block 222 of the reducer 220 to be described later. In the case that the reducer 220 reciprocates, the rail hole 217 plays a role of a guide in which the rail block 222 moves to be slidable. That is, the rail block 222 moves slidably along the rail hole 217 of an elongated hole form, on the whole, the reducer 220 can reciprocate.

Both side walls of the rail hole 217 form guide rails 212a and 212b with which sliding grooves 222a and 222b formed in both sides of the rail block 222 are engaged and which move slidably (see FIG. 6C). That is, the sliding grooves 222a and 222b formed in both sides of the rail block 222 are engaged with the guide rails 212a and 212b formed in both side walls of the rail hole 217, and then move along the guide rails 212a and 212b, so that the reducer 220 reciprocates on the whole.

A through-hole 217a is further formed in one side of the rail hole 217. The through-hole 217a is used as a path which communicates with the rail hole 117, and into which the rail block 222 formed in the reducer 220 is inserted, that is, a path being combined with the bracket 210. The rail block 222 is inserted upwards into the second transverse portion 212 through the through-hole 217a and then is coupled with the rail hole 217. Here, the through-hole 217a is penetratively formed greater than the volume of the rail block 222.

The second longitudinal portion 214 is in parallel with the first longitudinal portion 213, at the end of the second transverse portion 212. In the present preferred embodiment, the second longitudinal portion 214 is formed shorter in comparison with the first longitudinal portion 213.

In the meantime, in the case of the prior art, reducers (not shown) have been nearly formed in a bent Γ-shaped form. The reason why the reducers (not shown) have been nearly formed in a bent Γ-shaped form as described above is to install the sprinkler head 245 on the ceiling "A."

However, since the sprinkler head 245 is installed on the side wall "B" in the present preferred embodiment, there is no need to apply the reducer 220 in the form of a Γ-shaped form. Thus, in this embodiment, a linear type reducer 220 is applied to the sprinkler head 245. The linear type reducer 220 is arranged in parallel with the second transverse portion 212 in the lower portion of the second transverse portion 212, and reciprocates by an adjusting bolt 230 along the lengthy direction of the second transverse portion 212. Here, the meaning that the reducer 220 reciprocates along the lengthy direction of the second transverse portion 212 means controlling an access of the reducer 220 to the side wall "B" and a separation distance between the reducer 220 and the side wall "B."

A flexible tube 240 through which water flows is combined at one end 220a of the linear type reducer 220 formed of a tubular body, and the sprinkler head 245 for construction of the side wall "B" is combined with the other end 220b. The flexible tube 240 indicates a tube having a characteristic of being easily bent or curved due to its own elastic feature.

A rail block 222 is formed in the upper-center portion of the linear type reducer 220 in which the rail block 222 which is protruded upwards from the corresponding position is engaged with the rail hole 217 formed in the second transverse portion 212 and moves along the rail. Here, as described above, a coupling between the rail hole 217 and the rail block 222 is accomplished with for example a dovetail coupling structure. Therefore, the rail block 222 is not arbitrarily separated from the rail hole 217. In this second embodiment, the rail block 222 is formed higher than that of the rail block 122 of the first embodiment, and a screw tap 222c with which an adjusting bolt 230 is screw-connected is formed in the plate surface of the rail block 222.

The adjusting bolt 230 is an element which substantially moves the reducer 220. The adjusting bolt 230 is inserted into a through-hole (not shown) formed in the second longitudinal portion 214 and is screw-connected with the screw tap 222c formed in the rail block 222. The adjusting bolt 230 plays a role of reciprocating the reducer 220 in a direction which is in parallel with the second transverse portion 212 at the time of forward or backward rotation. In order to suppress the adjusting bolt 230 from being arbitrarily separated, a nut 234 is further provided in the adjusting bolt 230.

By this configuration, a method of installing the sprinkler head 245 on a side wall "B" will be briefly described.

Firstly, the rail block 222 formed in the reducer 220 is inserted upwards through the through-hole 217a formed in the second transverse portion 212 of the bracket 210, and then sliding grooves 222a and 222b formed in both sides of the rail block 222 are engaged with guide rails 212a and 212b formed in both side walls of the rail hole 217. In this way, at the state of coupling the reducer 220 with the bracket 210, the first transverse portion 211 of the bracket 210 is arranged on the ceiling "A." The bolt which is the fixing member 216 is inserted into the elongated hole 211a and screw-coupled on the ceiling "A." Therefore, the bracket 210 becomes a state of hanging on the ceiling "A," and the other end 220b of the reducer 220 becomes a state of being positioned to be horizontal to the side wall hole B1 formed in the side wall "B."

Then, the flexible tube 240 is coupled with one end 220a of the reducer 220. The sprinkler head 245 is coupled with the other end 220b of the reducer 220 through the side wall hole B1 formed in the side wall "B." Accordingly, the sprinkler head 245 can be conveniently installed on the side wall "B."

If the other end 220b of the reducer 220 approaches too closely to the side wall hole B1 which is formed in the side wall "B" or the former is spaced too far from the latter, it is difficult to couple the sprinkler head 245 with the other end 220b of the reducer 220. As being the case, the reducer 220 is reciprocated in the direction which is in parallel with the second transverse portion 212, while rotating the adjusting bolt 230 in the forward or reverse direction. Thereafter, the sprinkler head 245 is coupled with the other end 220b of the reducer 120 if the other end 220b of the reducer 220 reaches an appropriate location. That is, if the adjusting bolt 230 is rotated in the forward or reverse direction, the reducer 220 can reciprocate in the direction which is in parallel with the second transverse portion 212 with respect to the bracket 210 fixed by the screw-connection of the screw tap 222c and the adjusting bolt 230. Here, the sliding grooves 222a and 222b formed in both sides of the rail block 222, move along the second guide rails 212a and 212b, at the state of being engaged with the second guide rails 212a and 212b formed in both side walls of the rail hole 217. Accordingly, on the whole, the reducer 220 can steadily reciprocate.

In this way, according to this embodiment, since the reducer 220 is configured to easily adjust a distance from the side wall "B" in the vertical direction as well as in the horizontal direction, a connection work between the reducer 220 and the sprinkler head 245 for the side wall "B" construction connected to the reducer 220 can be conveniently performed, and the intensity of the reducer fixing structure can be reinforced.

In particular, according to this embodiment, the rail block 222 can be coupled upwards with the bracket 210. Accordingly, a work can be very conveniently performed, and a reciprocating distance of the reducer 220 can be more widely secured.

Figure 8A:
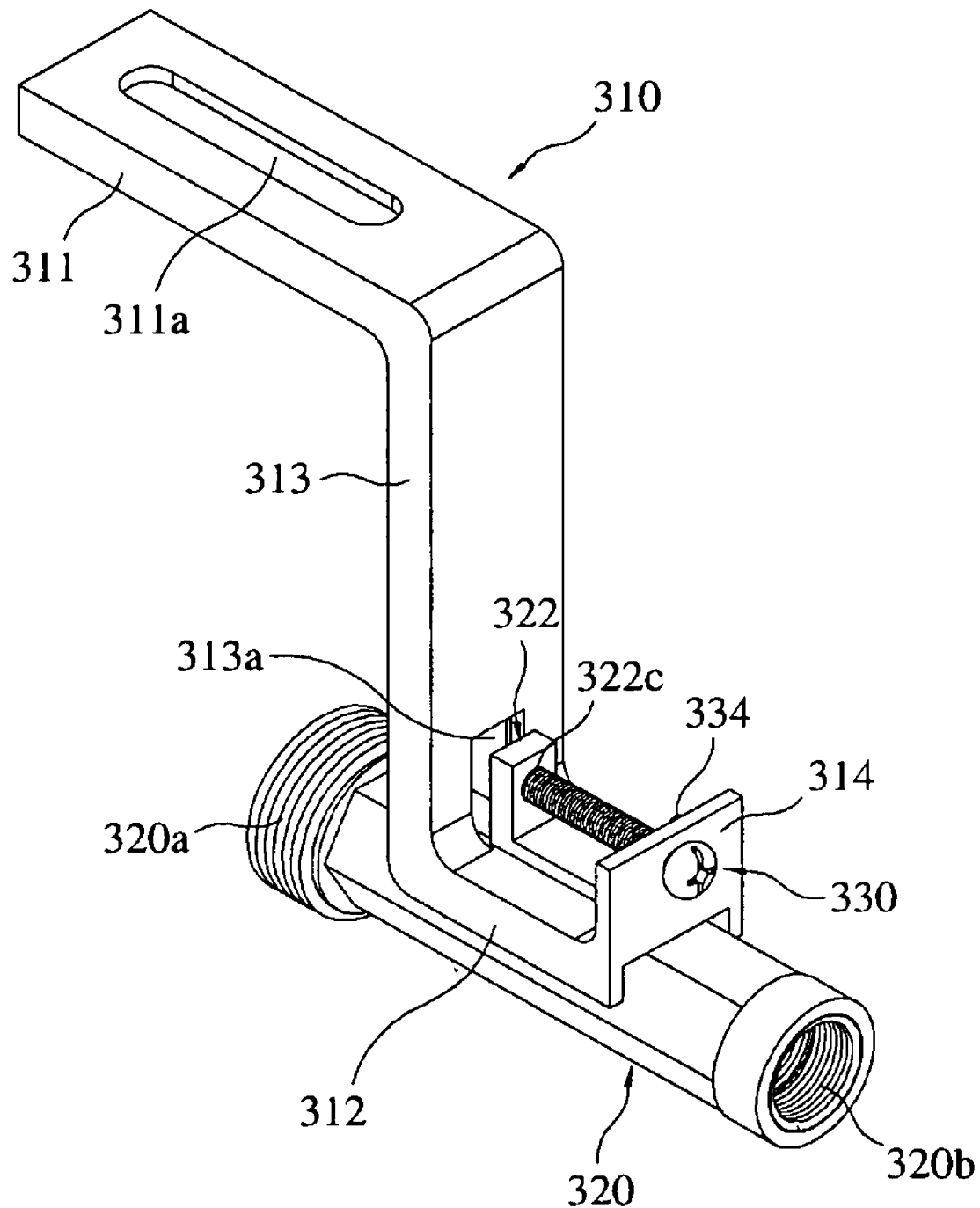
FIG. 8A is a perspective view showing a structure for fixing a reducer for a sprinkler for side wall construction according to a third preferred embodiment of the present invention.
Figure 8B:
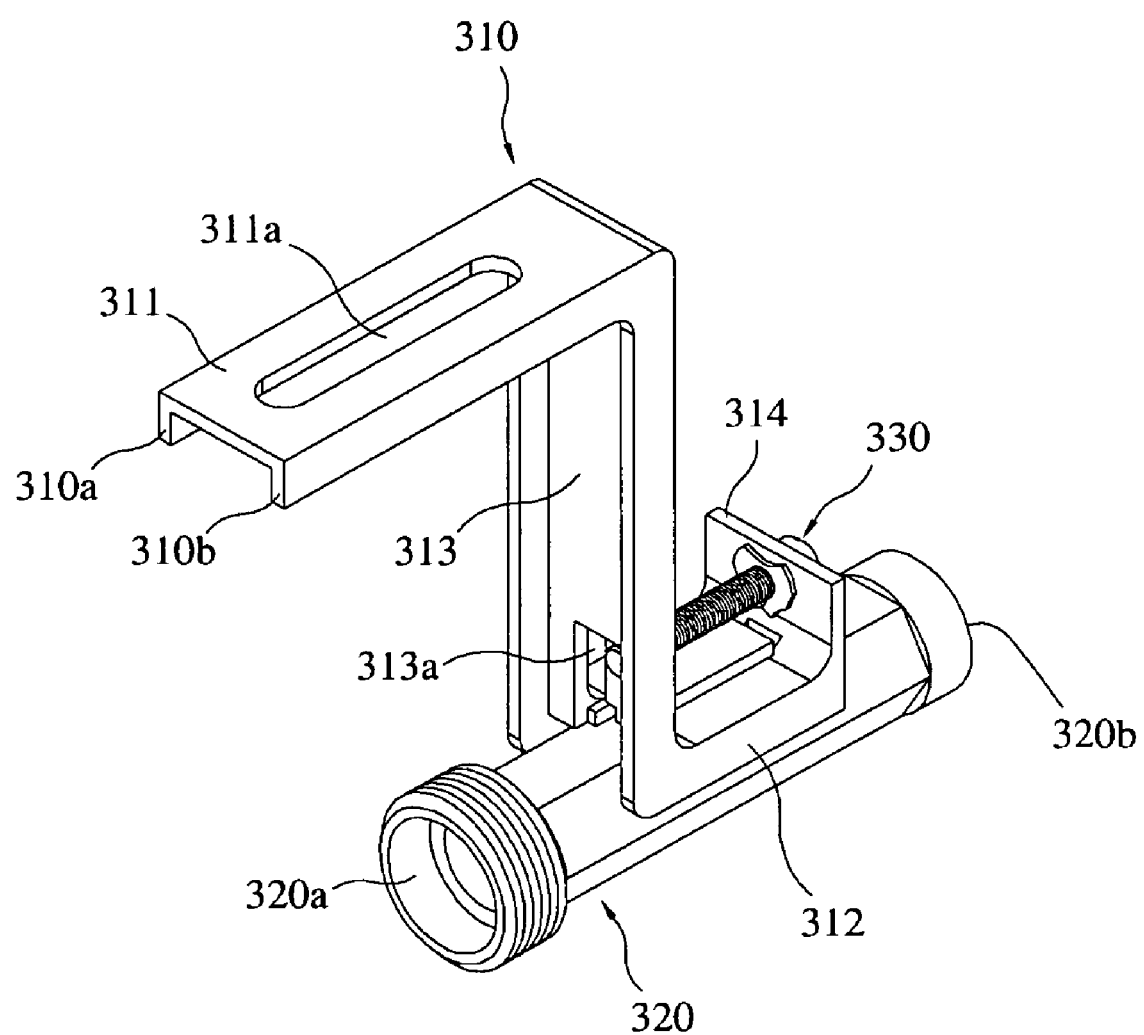
FIG. 8B is a perspective view showing the structure for fixing a reducer for a sprinkler for side wall construction of FIG. 8A, which is viewed in another direction.
Figure 8C:
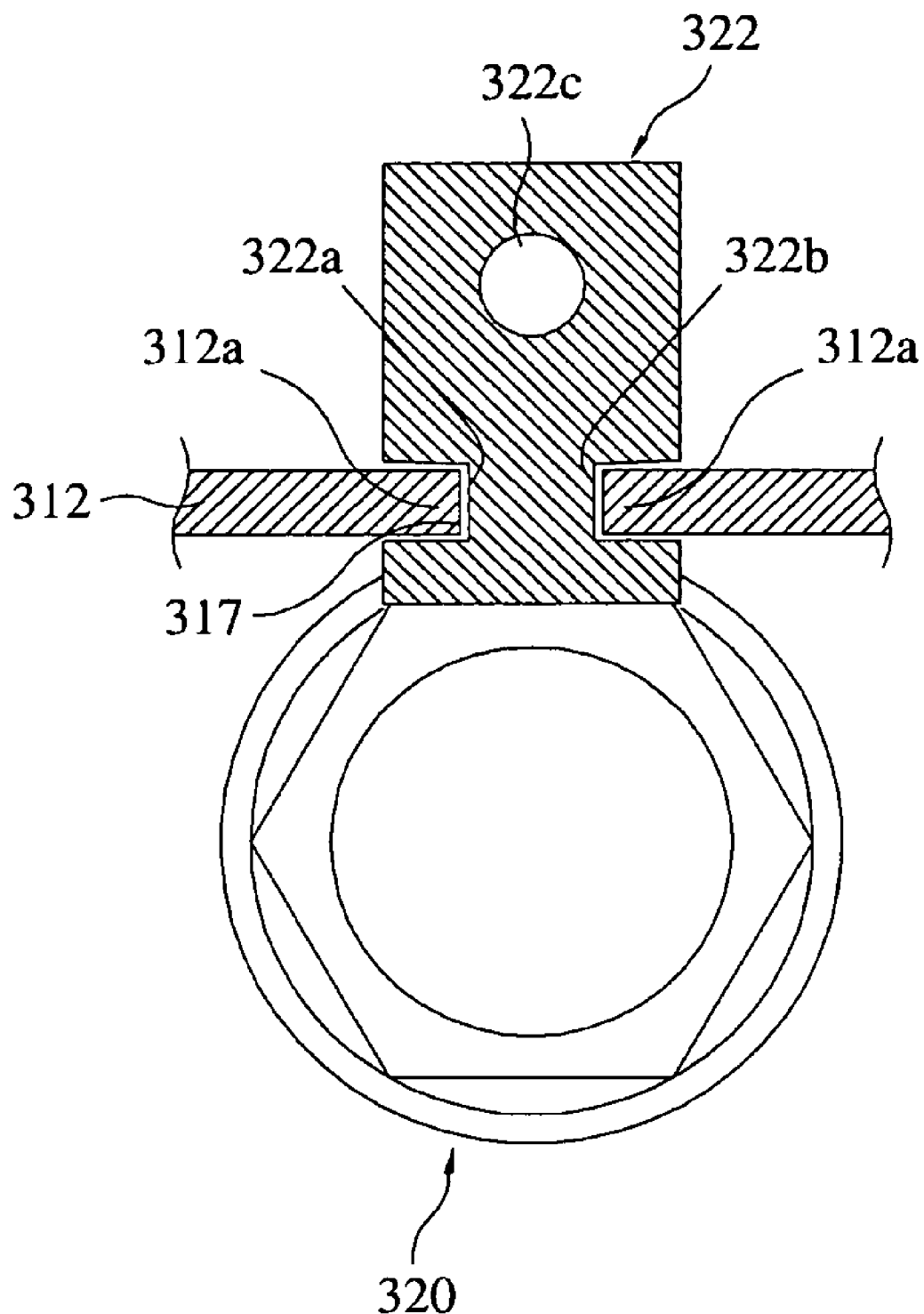
FIG. 8C is a schematic cross-sectional view of a rail block portion shown in FIG. 8A.
Figure 9:
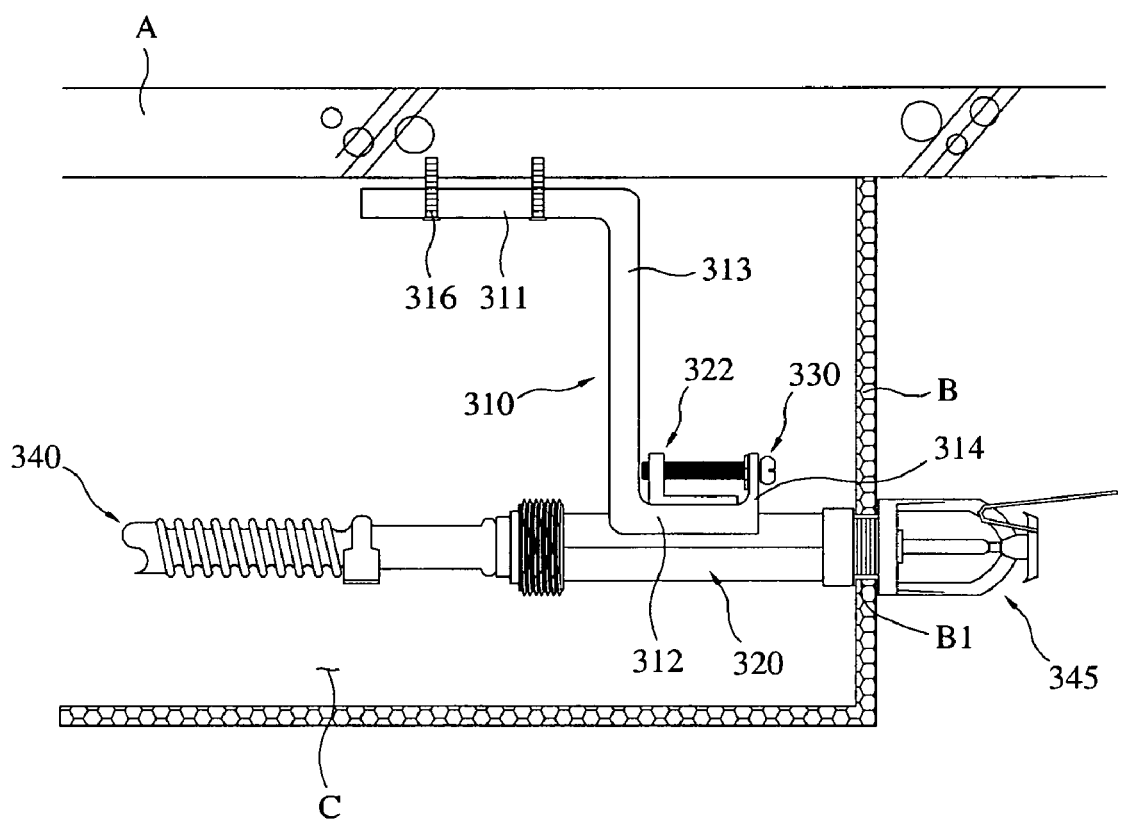
FIG. 9 is a sectional view showing the state where the structure for fixing a reducer for a sprinkler for side wall construction of FIGS. 8A and 8B has been constructed.

FIG. 8A is a perspective view showing a structure for fixing a reducer for a sprinkler for side wall construction according to a third preferred embodiment of the present invention. FIG. 8B is a perspective view showing the structure for fixing a reducer for a sprinkler for side wall construction of FIG. 8A, which is viewed in another direction. FIG. 8C is a schematic cross-sectional view of a rail block portion shown in FIG. 8A. FIG. 9 is a sectional view showing the state where the structure for fixing a reducer for a sprinkler for side wall construction of FIGS. 8A and 8B has been constructed.

Referring to FIGS. 8A through 9, a structure for fixing a reducer for a sprinkler in side wall construction, according to a third preferred embodiment of the present invention includes a bracket 310, a reducer 320, and an adjusting bolt 330.

In addition to a flexible tube 340 to be described later, the bracket 310, the reducer 320 and the adjusting bolt 330 are mounted in an internal space "C" of a side wall "B," and only a head 345 of the sprinkler is exposed and suspended to the outer side of the side wall "B." The respective structures will be described below in detail.

The bracket 310 includes first and second transverse portions 311 and 312, and first and second longitudinal portions 313 and 314. The bracket 310 including the first and second transverse portions 311 and 312 and the first and second longitudinal portions 313 and 314 can be integrally formed of a metal material.

However, since the protection scope of the present invention is not limited to thereto, the first and second transverse portions 311 and 312 and the first and second longitudinal portions 313 and 314 can be individually manufactured, respectively, and then mutually assembled. An assembly method such as welding can be applied during assembling the first and second transverse portions 311 and 312 and the first and second longitudinal portions 313 and 314 if they are made of the metal material.

Here, the metal material mentioned indicates a material which is not substantially easily corroded, for example, a material such as stainless steel and aluminum. However, it can be replaced with engineering plastics if the intensity can suffice.

The bracket 310 may be formed of a linear type metal plate having a certain thickness. However, in this preferred embodiment, the bracket 310 is manufactured to have edge portions 310a and 310b for the strength reinforcement. That is, as shown in FIG. 8B, the bracket 310 has a U-shaped form in which the edge portions 310a and 310b for reinforcement are bent at both sides of the bracket 310. In this case, when compared with the case where the linear type metal plate is used, the bracket 110 having the edge portions 110a and 110b for the strength reinforcement has the advantage of reinforcing the intensity much more. Edge portions 310a and 310b for enforcement can be formed over the whole bracket 310, or can be formed only at a desired portion of the bracket 310.

The first transverse portion 311 is a portion which is fixed on the ceiling "A" with a plurality of fixing members 316, and is used as a portion which substantially supports the bracket 310 on the ceiling "A." A bolt can be used as the fixing member 316. An elongated hole 311a through which the fixing member 116 passes is formed in the plate surface of the first transverse portion 311, for the passage of a bolt. Like this, since the elongated hole 311a is formed, a fastening work of the fixing member 316 is advantageously performed more smoothly and easily. In the drawings, two bolts are used to fix the first transverse portion 311 on the ceiling "A" but it is nothing but one embodiment.

The first longitudinal portion 313 is formed perpendicularly with the first transverse portion 311, at one end of the first transverse portion 311. The first longitudinal portion 313 is formed in order to adjust a distance between the reducer 320 and the ceiling "A." That is, in the case that the length of the first longitudinal portion 313 is long, the reducer 320 can be disposed at a remote distance downwards from the ceiling "A" and if the length of the first longitudinal portion 313 is short, the reducer 320 can be arranged adjacent to the ceiling "A." Therefore, the length of the first longitudinal portion 313 can be appropriately design-changed according to the situation of the construction site, that is, sprinklers are installed, unlike the illustrated manner.

A through-hole 313a is further formed in this first longitudinal portion 313. The through-hole 313a is formed at a spot nearly contacting the first longitudinal portion 313 and the second transverse portion 312, and communicates with the rail hole 317 formed in the plate surface of the second transverse portion 312. The through-hole 313a is used as a path into which the rail block 322 formed in the reducer 320 is inserted in the lateral direction, that is, a path being combined with the bracket 310. Therefore, the through-hole 313a is penetratively formed greater than the volume of the rail block 322.

The second transverse portion 312 is formed in parallel with the first transverse portion 311, on the bottom of the first longitudinal portion 313. In the case of the present preferred embodiment, the second transverse portion 312 is formed shorter in comparison with the first transverse portion 311. A rail hole 317 is penetratively formed in the plate surface of the second transverse portion 312. The rail hole 317 is utilized as a space engaging with the rail block 322 of the reducer 320 to be described later. In the case that the reducer 320 reciprocates, the rail hole 317 plays a role of a guide in which the rail block 322 moves to be slidable. That is, the rail block 322 moves slidably along the rail hole 317 of an elongated hole form, on the whole, the reducer 320 can reciprocate.

Both side walls of the rail hole 317 form guide rails 312a and 312b with which sliding grooves 322a and 322b formed in both sides of the rail block 322 are engaged and which move slidably (see FIG. 8C). That is, the sliding grooves 322a and 322b formed in both sides of the rail block 322 are engaged with the guide rails 312a and 312b formed in both side walls of the rail hole 317, and then move along the guide rails 312a and 312b, so that the reducer 320 reciprocates on the whole.

The second longitudinal portion 314 is in parallel with the first longitudinal portion 313, at the end of the second transverse portion 312. In the present preferred embodiment, the second longitudinal portion 314 is formed shorter in comparison with the first longitudinal portion 313.

In the meantime, in the case of the prior art, reducers (not shown) have been nearly formed in a bent Γ-shaped form. The reason why the reducers (not shown) have been nearly formed in a bent Γ-shaped form as described above is to install the sprinkler head 345 on the ceiling "A."

However, since the sprinkler head 345 is installed on the side wall "B" in the present preferred embodiment, there is no need to apply the reducer 320 in the form of a Γ-shaped form.

Thus, in this embodiment, a linear type reducer 320 is applied to the sprinkler head 345. The linear type reducer 320 is arranged in parallel with the second transverse portion 312 in the lower portion of the second transverse portion 312, and reciprocates by an adjusting bolt 330 along the lengthy direction of the second transverse portion 312. Here, the meaning that the reducer 320 reciprocates along the lengthy direction of the second transverse portion 312 means controlling an access of the reducer 320 to the side wall "B" and a separation distance between the reducer 320 and the side wall "B."

A flexible tube 340 through which water flows is combined at one end 320a of the linear type reducer 320 formed of a tubular body, and the sprinkler head 345 for construction of the side wall "B" is combined with the other end 320b. The flexible tube 340 indicates a tube having a characteristic of being easily bent or curved due to its own elastic feature.

A rail block 322 is formed in the upper-center portion of the linear type reducer 320 in which the rail block 322 which is protruded upwards from the corresponding position is engaged with the rail hole 317 formed in the second transverse portion 312 and moves along the rail. Here, as described above, a coupling between the rail hole 317 and the rail block 322 is accomplished with for example a dovetail coupling structure. Therefore, the rail block 322 is not arbitrarily separated from the rail hole 317. In this third embodiment, the rail block 322 is formed higher than that of the rail block 322 of the first embodiment, and a screw tap 322c with which an adjusting bolt 330 is screw-connected is formed in the plate surface of the rail block 322.

The adjusting bolt 330 is an element which substantially moves the reducer 320. The adjusting bolt 330 is inserted into the through-hole (not shown) formed in the second longitudinal portion 314 and is screw-connected with a screw tap 322c of the rail block 322. The adjusting bolt 330 plays a role of reciprocating the reducer 320 in a direction which is in parallel with the second transverse portion 312 at the time of forward or backward rotation. In order to suppress the adjusting bolt 330 from being arbitrarily separated, a bolt ring 332 is further provided in the adjusting bolt 330.

By this configuration, a method of installing the sprinkler head 345 on a side wall "B" will be briefly described.

Firstly, the rail block 322 formed in the reducer 320 is inserted through the through-hole 313a formed in the first longitudinal portion 313 of the bracket 310 in the lateral direction, and then sliding grooves 322a and 322b formed in both sides of the rail block 322 are engaged with guide rails 312a and 312b formed in both side walls of the rail hole 317. In this way, at the state of coupling the reducer 320 with the bracket 310, the first transverse portion 311 of the bracket 310 is arranged on the ceiling "A." The bolt which is the fixing member 316 is inserted into the elongated hole 311a and screw-coupled on the ceiling "A." Therefore, the bracket 310 becomes a state of hanging on the ceiling "A," and the other end 320b of the reducer 320 becomes a state of being positioned to be horizontal to the side wall hole B1 formed in the side wall "B."

Then, the flexible tube 340 is coupled with one end 320a of the reducer 320. The sprinkler head 345 is coupled with the other end 320b of the reducer 320 through the side wall hole B1 formed in the side wall "B." Accordingly, the sprinkler head 345 can be conveniently installed on the side wall "B."

If the other end 320b of the reducer 320 approaches too closely to the side wall hole B1 which is formed in the side wall "B" or the former is spaced too far from the latter, it is difficult to couple the sprinkler head 345 with the other end 320b of the reducer 320. As being the case, the reducer 320 is reciprocated in the direction which is in parallel with the second transverse portion 312, while rotating the adjusting bolt 330 in the forward or reverse direction. Thereafter, the sprinkler head 345 is coupled with the other end 320b of the reducer 320 if the other end 320b of the reducer 320 reaches an appropriate location. That is, if the adjusting bolt 330 is rotated in the forward or reverse direction, the reducer 320 can reciprocate in the direction which is in parallel with the second transverse portion 312 with respect to the bracket 310 fixed by the screw-connection of the screw tap 322c and the adjusting bolt 330. Here, the sliding grooves 322a and 322b formed in both sides of the rail block 322, move along the second guide rails 312a and 312b, at the state of being engaged with the second guide rails 312a and 312b formed in both side walls of the rail hole 317. Accordingly, on the whole, the reducer 320 can steadily reciprocate.

In this way, according to this third embodiment, since the reducer 320 is configured to easily adjust a distance from the side wall "B" in the vertical direction as well as in the horizontal direction, a connection work between the reducer 320 and the sprinkler head 345 for the side wall "B" construction connected to the reducer 320 can be conveniently performed, and the intensity of the reducer fixing structure can be reinforced.

As described above, the present invention has been described with respect to particularly preferred embodiments. However, the present invention is not limited to the above embodiments, and it is possible for one who has an ordinary skill in the art to make various modifications and variations, without departing off the spirit of the present invention. Thus, the protective scope of the present invention is not defined within the detailed description thereof but is defined by the claims to be described later and the technical spirit of the present invention.

As described above, since the reducer is configured to easily adjust a distance from the side wall in the vertical direction as well as in the horizontal direction, a connection work between the reducer and the sprinkler head for the side wall construction connected to the reducer can be conveniently performed, and the intensity of the reducer fixing structure can be reinforced.

The invention claimed is:

1. A structure for fixing a reducer for a sprinkler in side wall construction, the reducer fixing structure comprising:
a bracket including a first transverse portion having an elongated hole formed in order to be fixed on a ceiling with at least one fixing member, a first longitudinal portion which is bent perpendicularly with the first transverse portion at one end of the first transverse portion, and simultaneously a through-hole with which a rail block is fitted is formed, a second transverse portion which is formed in parallel with the first transverse portion on the bottom of the first longitudinal portion, in which a rail hole is formed in a plate surface thereof, and a second longitudinal portion is formed in parallel with the first longitudinal portion at an end part of the second transverse portion, in which a through-hole is formed in a plate surface thereof,
a reducer including a rail block which is formed into a linear type tubular body with one end of which a flexible tube is combined and with the other end of which the head of the sprinkler for side wall construction is combined, and which is arranged in parallel with the second transverse portion at the lower portion of the second transverse portion, and is protruded from the upper-center portion of the reducer, in which sliding grooves formed in the rail block are engaged with a rail hole formed at the second transverse portion to thereby allow the rail block to move in the form of a rail; and
an adjusting bolt which is inserted into the through-hole of the second longitudinal portion and is screwed into a screw tap of the rail block, to thus enable the reducer to reciprocate in the direction which is in parallel with the second transverse portion during forward and backward rotation.

* * * * *